US012665275B2

(12) United States Patent
    Khaira et al.

(10) Patent No.:  US 12,665,275 B2
(45) Date of Patent:  Jun. 23, 2026

(54) ANALOG TUNING IN RECONFIGURABLE INTELLIGENT SURFACE UTILIZING IN-PLANE MICROELECTROMECHANICAL SYSTEMS

(71) Applicant: Dell Products L.P., Round Rock, TX (US)

(72) Inventors: Navjot Kaur Khaira, Manotick (CA); Tejinder Singh, Manotick (CA)

(73) Assignee: Dell Products L.P., Round Rock, TX (US)

( * ) Notice: Subject to any disclaimer, the term of this patent is extended or adjusted under 35 U.S.C. 154(b) by 123 days.

(21) Appl. No.: 18/673,215

(22) Filed: May 23, 2024

(65) Prior Publication Data
    US 2025/0364710 A1     Nov. 27, 2025

(51) Int. Cl.
    *H01P 1/18*       (2006.01)
    *H01P 7/00*       (2006.01)
    *H04B 7/04*       (2017.01)

(52) U.S. Cl.
    CPC ................. *H01P 1/18* (2013.01); *H01P 7/00* (2013.01); *H04B 7/04013* (2023.05)

(58) Field of Classification Search
    CPC .......... H01P 1/18; H01P 7/00; H04B 7/04013
    See application file for complete search history.

(56) References Cited

U.S. PATENT DOCUMENTS 5,903,380 A     5/1999  Motamedi et al.
7,323,952 B2    1/2008  Pan et al.

8,111,114 B2    2/2012  Bhave et al.
8,269,395 B2    9/2012  He et al.
9,640,867 B2 *  5/2017  Behdad ................ H01Q 15/148
                        (Continued)

FOREIGN PATENT DOCUMENTS

WO          9926333 A2      5/1999

OTHER PUBLICATIONS

Subrt et al., "Controlling Propagation Environments Using Intelligent Walls", 2012 6th European Conference on Antennas and Propagation (EUCAP), 2012, pp. 1-5.
                        (Continued)

*Primary Examiner* — Seung H Lee
(74) *Attorney, Agent, or Firm* — Amin, Turocy & Watson, LLP

(57)                ABSTRACT

The technology described herein is directed towards a reconfigurable intelligent surface (RIS) based on microelectromechanical systems (MEMS) technology, in which MEMS micro-actuators are coupled to unit cells of the RIS. A unit cell's split ring includes a gap into which a laterally moveable metallic insert, of a laterally moveable beam, is inserted or retracted based on controlled voltages applied to MEMS actuators. When actuated, an actuator pushes the inserts attached to the laterally movable beam respect to the split rings' gaps (e.g., of a unit cell subgroup). The amount of lateral displacement of the metallic inserts is based on the voltages applied to the actuators, which changes the structure of the unit cell's geometry, whereby analog-like tuning of the unit cell's characteristics (including phase shift) is obtained. When combined with the voltage-controlled phase shifts of other unit cells of the RIS, beamforming of a reflected incoming electromagnetic wave is achieved.

20 Claims, 18 Drawing Sheets

(56)        References Cited

U.S. PATENT DOCUMENTS

| | | |
|---|---|---|
| 2003/0058069 A1 | 3/2003 | Schwartz et al. |
| 2017/0141755 A1 | 5/2017 | Holyoak et al. |
| 2025/0293728 A1* | 9/2025 | Singh ........................ H01Q 3/46 |

OTHER PUBLICATIONS

Kaina et al., "Shaping Complex Microwave Fields in Reverberating Media with Binary Tunable Metasurfaces", Scientific Reports, vol. 4, No. 6693, Oct. 21, 2014, 8 pages.

Baladi et al., "Dual-Band Circularly Polarized Fully Reconfigurable Reflectarray Antenna for Satellite Applications in the Ku-Band", IEEE Transactions of Antennas and Propagation, vol. 69, No. 12, Dec. 2021, 10 pages.

Singh et al., "Modeling of Frequency Shift in RF-MEMS Switches Under Residual Stress Gradient", 2018 18th International Symposium on Antenna Technology and Applied Electromagnetics (ANTEM), 2018, 3 pages.

Khaira, Navjot Kaur, "Soi RF-MEMS Based Variable Attenuator for Millimeter Wave Applications", Master's thesis, University of Waterloo, 2019, 118 pages.

Khaira et al., "Monolithically Integrated RF MEMS-Based Variable Attenuator for Millimeter-Wave Applications", in IEEE Transactions on Microwave Theory and Techniques, vol. 67, No. 8, Aug. 2019, pp. 3251-3259.

Singh et al., "Monolithically Integrated Reconfigurable RF MEMS Impedance Tuner on SOI Substrate", 2019 IEEE MTT-S International Microwave Symposium (IMS), 2019, pp. 790-792.

Singh, et al. "Bimorph Microelectromechanical Systems (MEMS) Integration for Analog Tunability in Metasurfaces" U.S. Appl. No. 18/673,205, filed May 23, 2024, 41 pages.

Khaira, et al. "Microelectromechanical Systems (MEMS) Integration for Analog Tunability in Reconfigurable Intelligent Surfaces" U.S. Appl. No. 18/673,210, filed May 23, 2024, 40 pages.

Singh, et al. "Dual Ring Microelectromechanical Systems Integration for Analog Tunability in Reconfigurable Intelligent Surfaces" U.S. Appl. No. 18/808,987, filed Aug. 19, 2024, 46 pages.

Office Action mailed Apr. 28, 2026 for U.S. Appl. No. 18/673,210, 35 pages.

* cited by examiner

ANALOG TUNING IN RECONFIGURABLE INTELLIGENT SURFACE UTILIZING IN-PLANE MICROELECTROMECHANICAL SYSTEMS

BACKGROUND

Reconfigurable intelligent surfaces (alternatively referred to metasurfaces) are manmade thin reflective or refractive surfaces with electronically adjustable properties that can manipulate electromagnetic waves. A reconfigurable intelligent surface is generally characterized by having a two-dimensional planar array of sub-wavelength structures, known as unit cells, whose characteristics are primarily dictated by the geometry of these structures. These elements are capable of altering the phase shift of the reflected signals, through active elements such as PIN diodes or varactors that tune electromagnetic responses, whereby through precise adjustment of these phase shifts, sophisticated reflect beam-forming can be executed.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
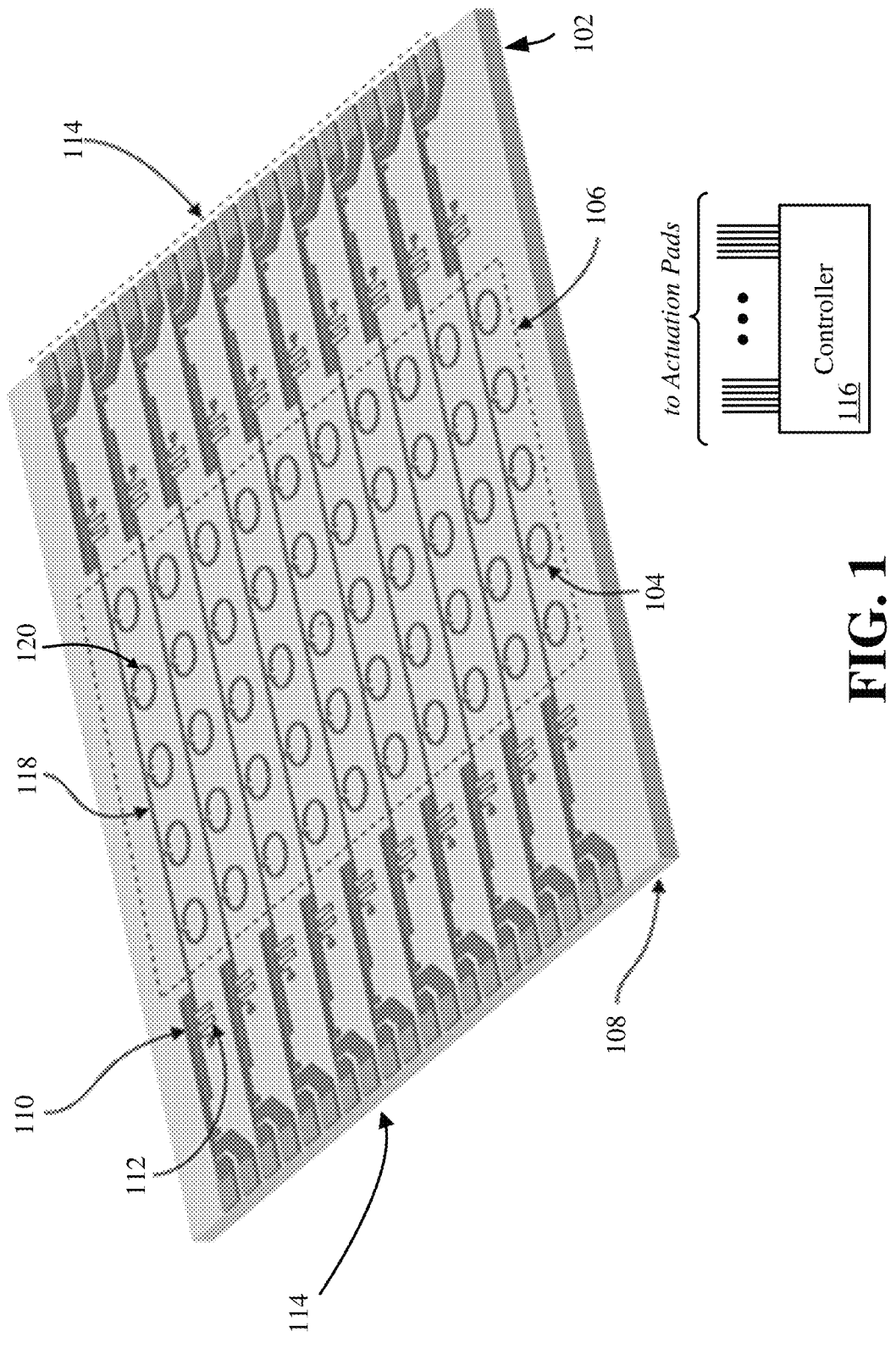
FIG. 1 is a three-dimensional perspective view representation of an example reconfigurable intelligent surface of unit cells for redirecting an incoming electromagnetic signal based on microelectromechanical systems (MEMS)-based phase control, in accordance with various example embodiments and implementations of the subject disclosure.

The technology described herein is generally directed towards a reconfigurable intelligent surface of unit cells that achieves dynamic control of the unit cells through the structural reconfiguration of unit-cell geometry using micro-electromechanical systems (MEMS). In general, MEMS are miniature integrated devices or systems that combine electrical and mechanical components, which range in size from a few micrometers to millimeters, enabling technology to operate at a scale previously unachievable. Fabricated through microfabrication techniques akin to those in the semiconductor industry, MEMS devices offer mass production capabilities with high reliability and consistency at a relatively low cost. These versatile systems find extensive applications across various domains including automotive, consumer electronics, healthcare, and telecommunications. With reconfigurable intelligent surfaces falling within the millimeter or microscale range for millimeter-wave frequencies, MEMS integration as described herein is a very suitable platform. Indeed, technology described herein is compatible with the multi-user commercial fabrication processes, making the system very feasible and scalable. In general, the technology described herein achieves unit cell reconfigurability in using electrothermally actuated MEMS actuators. Among other benefits, this decouples radio frequency signals received at and redirected by the unit cells from the DC power used for the electrothermal actuation. As will be understood, the technology involves multicycle operation of electrothermally reconfigurable MEMS using a laterally moving beam structure and an electrothermal actuator that moves pushes the beam structure laterally as result of joule heating when current flows through the electrothermal actuator. In particular, the laterally moving beam structure is coupled to or includes protruding inserts on one side that align with fixed split ring resonators with gaps. Movement of the laterally moving beam structure moves the protruding inserts on one side of beam structure a lateral displacement distance, at the gaps, in a direction towards or away from the centers of the fixed split ring resonators, in the same plane as the split rings. The amount of displacement is based on the voltage bias applied to the electrothermal actuator.

One example implementation utilizes two-hot-arm actuators, where in each actuator, temperature-driven differential expansion/contraction of the two hot arms and one cold arm, induced by a voltage difference, generates in-plane deformation of the actuator. This structural adaptation is used to finely adjust the electromagnetic properties of a reconfigurable intelligent surface in real-time. The design incorporates a movable metallic insert within split-ring type reconfigurable intelligent surface unit cells. Laterally moving the metallic insert using the two-hot arm actuators alters the effective capacitance of the split-ring gap, tuning the RIS unit cell resonance frequency accordingly. This tuning at the unit cell level leads to desired beam steering from the reconfigurable intelligent surface panel. The integration of MEMS and reconfigurable intelligent surface technologies overcomes current limitations in reconfigurable intelligent surfaces, advancing wireless communication solutions.

Structural reconfiguration of unit cell geometry using MEMS technology, by integrating MEMS actuators with unit cells of a reconfigurable intelligent surface as described herein, enables dynamic reshaping of unit cell geometries, facilitating tunable millimeter-wave response. The micro/millimeter scale dimensions of the MEMS actuator as described herein complement the size of unit cells at millimeter wave frequencies. This technology capitalizes on the structural displacement induced in the actuators under DC voltage bias, effectively altering the electromagnetic response of the unit cell. This structural adaptation is highly effective in finely adjusting the individual electromagnetic properties of a reconfigurable intelligent surface's unit cells in real-time.

The technology described herein thus achieves in-plane structural reconfigurability and continuous tunability in periodic electromagnetic reflective surfaces. MEMS micro actuators are integrated within a reconfigurable intelligent surface panel, facilitating dynamic reshaping of unit cell geometries. Each reconfigurable intelligent surface unit cell features a distinctive metallic pattern shaped like a split circular ring with a movable metallic insert in the gap. This metallic insert is installed on a movable beam that shows rectilinear motion with the help of two-hot-arm MEMS actuators, for example. This continuous structural deformation ensures reliable control of the insert/tip displacement with DC bias, which drives a shift in the resonance frequency of the reconfigurable intelligent surface unit cell towards lower frequencies. Consequently, an incident electromagnetic wave reflects off the two-dimensional array of such reconfigurable intelligent surface unit cells, exhibiting varying phase values determined by the structural displacement in each row (subgroup) of unit cells.

Employing an electrothermal actuation mechanism for lateral, in-plane displacement offers a higher tuning range, larger stroke, and enhanced repeatability, which is particularly effective for applications demanding substantial displacements and force outputs at the millimeter/microscale. Unlike approaches based on PIN diodes/varactors, which are limited to binary (1-bit) states in PIN diodes and six capacitance states in varactors, the utilization of MEMS out-of-plane actuators as described herein enables seamless, uninterrupted analog-type tuning over a large range. Electrothermal actuation provides significant displacement, thereby extending the tuning range. Through analog tuning of phase from individual unit cell, precise control over a reflected beam from a reconfigurable intelligent surface's unit cell array is achieved, enhancing adaptability and functionality across various applications.

The monolithic integration of MEMS actuators within reconfigurable intelligent surfaces as described herein provides significant advantages over traditional methods employing PIN diodes/varactors. Unlike these discrete components that need to be soldered onto the surface of the reconfigurable intelligent surface, MEMS actuators can be seamlessly incorporated into the fabrication process, ensuring a more streamlined and efficient assembly. Moreover, the integration of MEMS within a reconfigurable intelligent surface eliminates the need for complex biasing and extensive wiring, simplifying the overall design and reducing potential points of failure.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a three-dimensional perspective representation of a reconfigurable intelligent surface 102 having a number of unit cells, one of which is labeled 104. In this example, there is a 5×10 array 106 of unit cells forming the reconfigurable intelligent surface 102 on a substrate 108, showing the MEMS actuators and flexures at the ends of each row of unit cells. One MEMS actuator 110 and one flexure 112 is labeled in FIG. 1.

As will be understood, actuation pads 114 are electrically coupled to the MEMS actuators, by which a controller 116 selectively applies voltage biases to the MEMS actuators (e.g., the MEMS actuator 110). The controller 116 can apply the voltage biases directly to the actuation pads 114, or indirectly, e.g., to contacts beneath the substrate 108 that electrically couple to the actuation pads 114 through vias (not explicitly shown).

By way of example, applying a voltage bias to the actuation pads coupled to the MEMS actuator 110 heats the MEMS actuator 110 (joule heating effect), which moves an arm of the MEMS actuator 110 a lateral displacement distance as described herein. In turn, via contact points that physically (but not structurally) couple the free end of the MEMS actuator 110 to a laterally moving beam 118, the actuator movement pushes the laterally moving beam 118 a corresponding amount, whereby protruding inserts on one side of the laterally moving beam 118 move towards the centers of the resonating split rings of the unit cells aligned with the laterally moving beam 118; one of the resonating split rings of the unit cells aligned with the laterally moving beam 118 is labeled 120 in FIG. 1.

Note that the two electrothermal actuators on each row of unit cells are independent, which enables the fine tuning of the metamaterial, on condition that the proper bias network (separate for each actuator) is employed. The tuning property of phase is ensured, thus allowing the realization of reconfigurable intelligent surface. Also, the electrothermal principle of controllability provided by the two-hot-arm horizontal actuator enables the driving of such devices via a low voltage. The two actuators on the ends of each row can be provided equal voltage leading to equal displacement, or can be provided different voltage levels to get more sets of phase profiles, providing further control over the beam steering.

Figure 2:
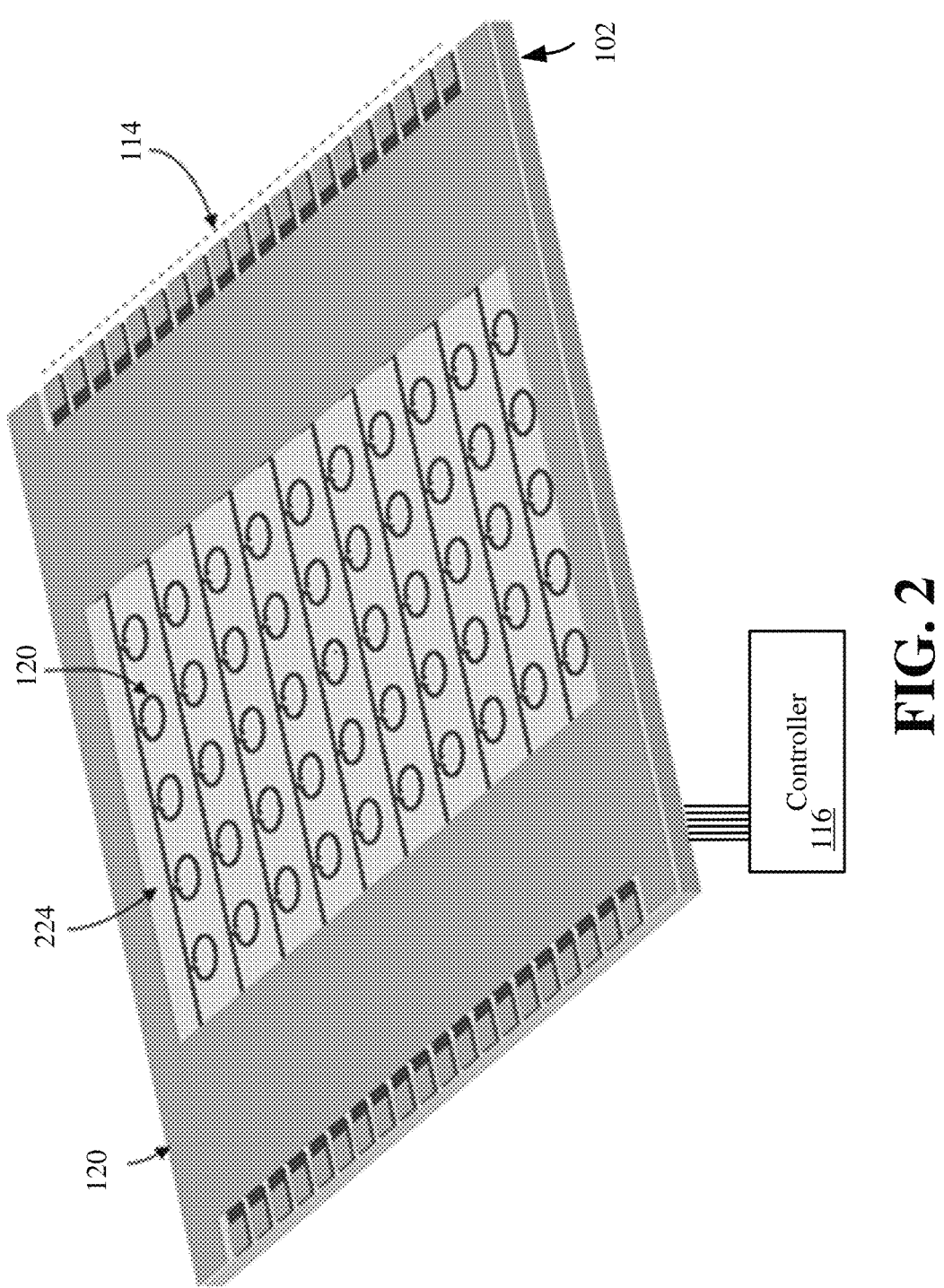
FIG. 2 is a three-dimensional perspective view representation of the example reconfigurable intelligent surface of FIG. 1 in which MEMS actuator devices are covered with a metallic cover, in accordance with various example embodiments and implementations of the subject disclosure.

FIG. 2 shows the reconfigurable intelligent surface 102 with a metallic cover 222 covering the MEMS actuators, e.g., in a "final, finished" product, leaving a metasurface window 224 for electromagnetic waves to reach the unit cells. In this way, only the unit cell elements and the actuation pads are revealed, by which an incoming electromagnetic signal is redirected in a direction that is based on the voltages provided to the actuation pads 114.

Figure 3:
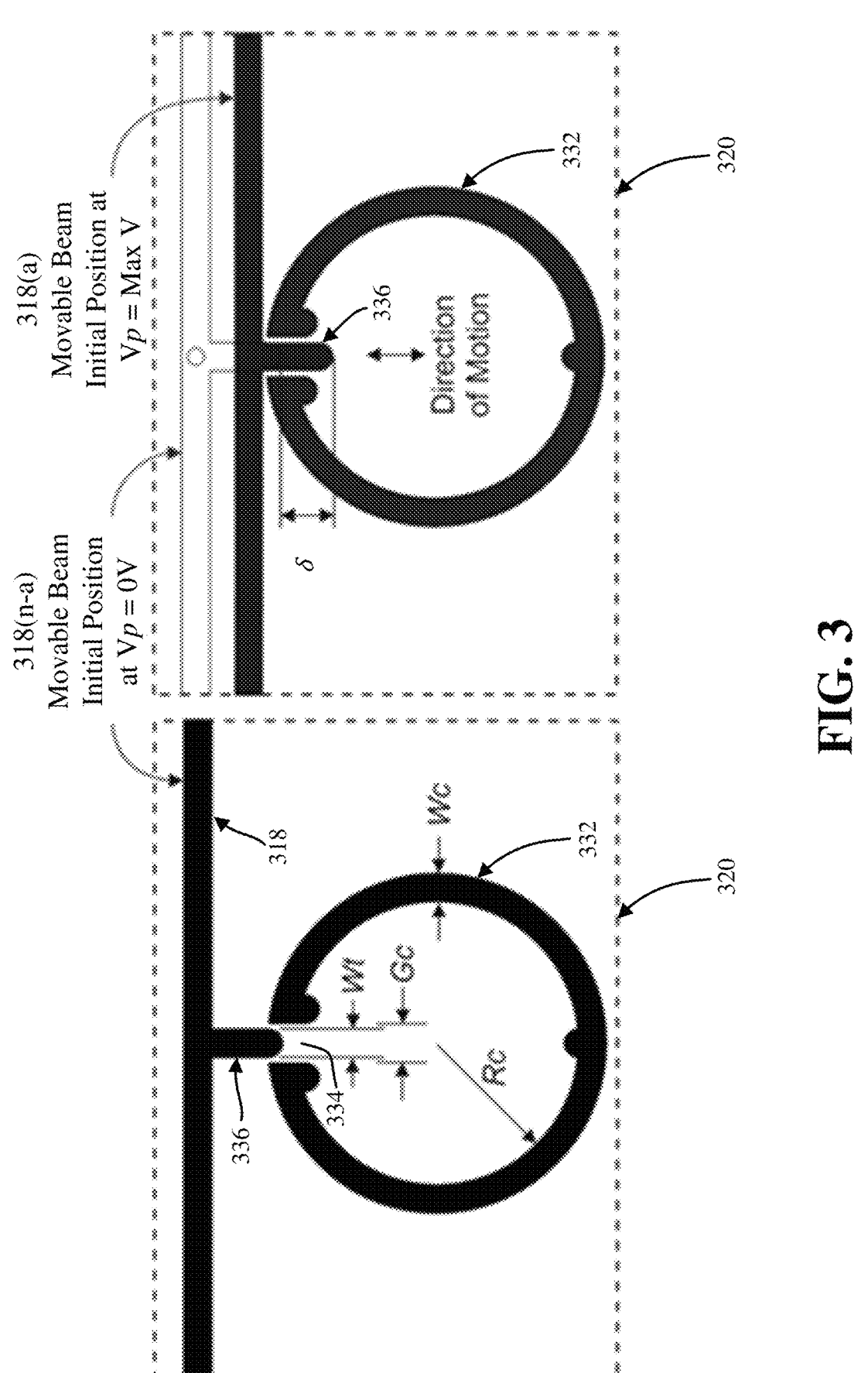
FIG. 3 is a representation of an example split-ring shaped reconfigurable intelligent surface unit cell with a protruding metallic insert installed on a movable beam aligned with a gap of the split ring resonator pattern, in accordance with various example embodiments and implementations of the subject disclosure.

FIG. 3 shows an enlarged view of a reconfigurable intelligent surface unit cell 320, including a split-ring shaped (penannular) split ring 332 having a gap 334 (width=Gc) and a radius Rc. A protruding metallic insert/tab 336 is installed on (e.g., coupled to or fabricated in conjunction with) a movable beam 318. As can be seen, the metallic insert 336 aligns with the gap 334, and has a width Wt that fits inside the gap width of the split ring 332.

In an initial position on the left side of FIG. 3, in which the electrothermal actuator (not shown in FIG. 3) is in a non-actuated state (Vp=0), the moveable beam 318 is secondarily labeled as 318(n-a) (non-actuated), and has a lateral displacement distance of zero. In a fully actuated position on the right side of FIG. 3, in which the electrothermal actuator (not shown in FIG. 3) is in a fully actuated state (Vp=Max), the moveable beam 318 is secondarily labeled as 318(a) (actuated), and has a lateral displacement distance of 8. The direction of motion is thus (substantially) in the Y-axis (into and out of the ring resonator), with the lateral displacement distance of the insert 336 being based on the amount the beam 318 is moved, which corresponds to the voltage applied to the actuator(s) to which the laterally moveable beam 318 is coupled, as described herein.

Figure 4:
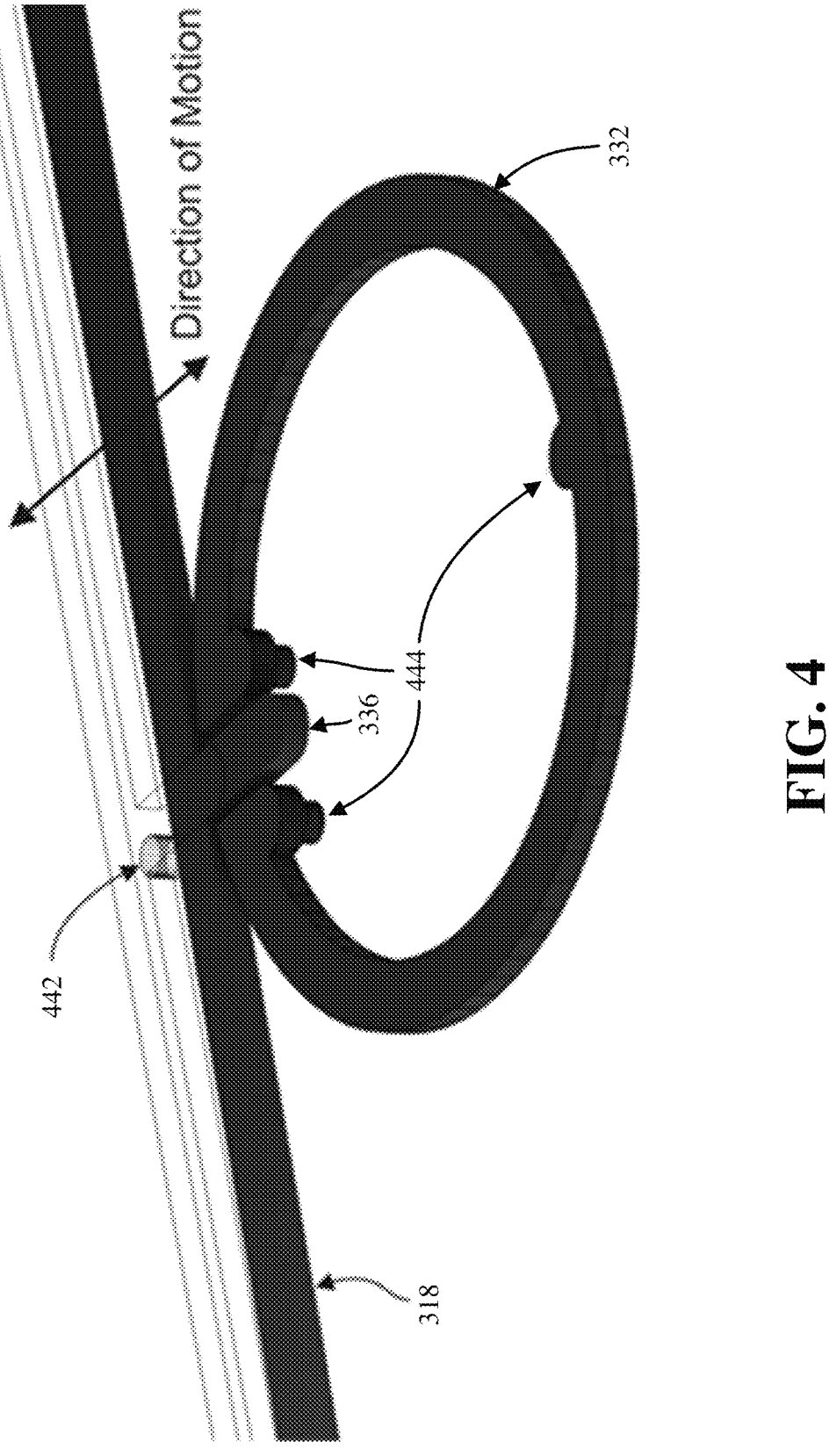
FIG. 4 is a three-dimensional perspective view representation showing how the example movable/free-standing beam moves laterally, while the split ring is fixed with the help of anchors, in accordance with various example embodiments and implementations of the subject disclosure.

To facilitate lateral movement of the free standing beam 318 in the XY-plane of the ring resonator, (and not in Z-direction), the beam is supported by rollers/dimples underneath the beam 318 as shown in FIG. 4; one of the rollers/dimples is labeled 442. The penannular ring 332 is fixed to the substrate (not explicitly shown in FIG. 4) via anchors 444.

Figure 5A:
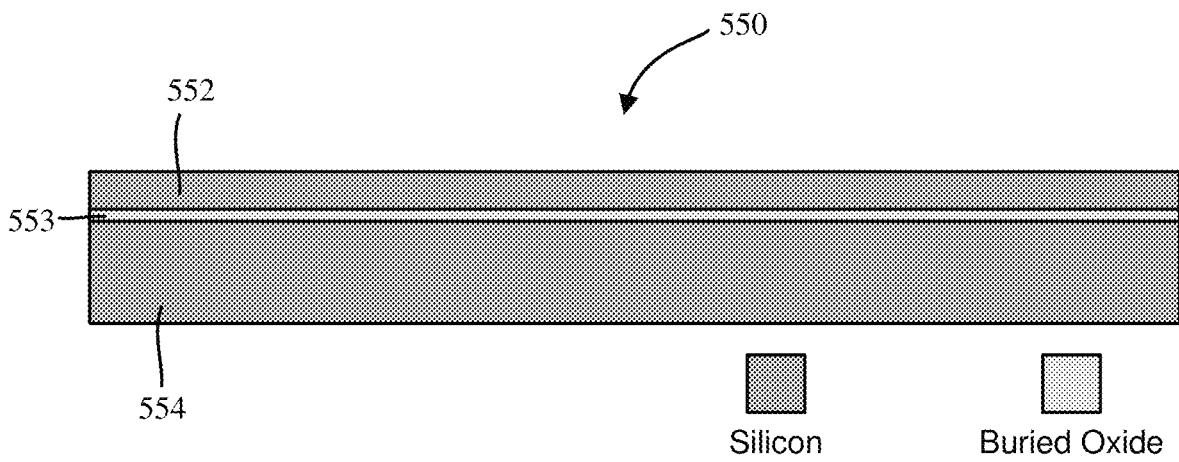
FIG. 5A is a side view of an example substrate with two silicon layers separated by a buried oxide, to be used in fabrication of the unit cell, in accordance with various example embodiments and implementations of the subject disclosure.

Turning to fabrication of the unit cell structures, the dimensions of the unit cell depend on the frequency of operation. A unit cell is fabricated together with other unit cells on a Silicon-on-Insulator (SOI) wafer 550 as shown in FIG. 5A, in the form of a tri-layer sandwich structure of a top low-resistivity silicon (Si) layer 552, and a bottom high-resistivity silicon layer 554, separated by a silicon dioxide (SiO$_2$) layer 553.

Figure 5B:
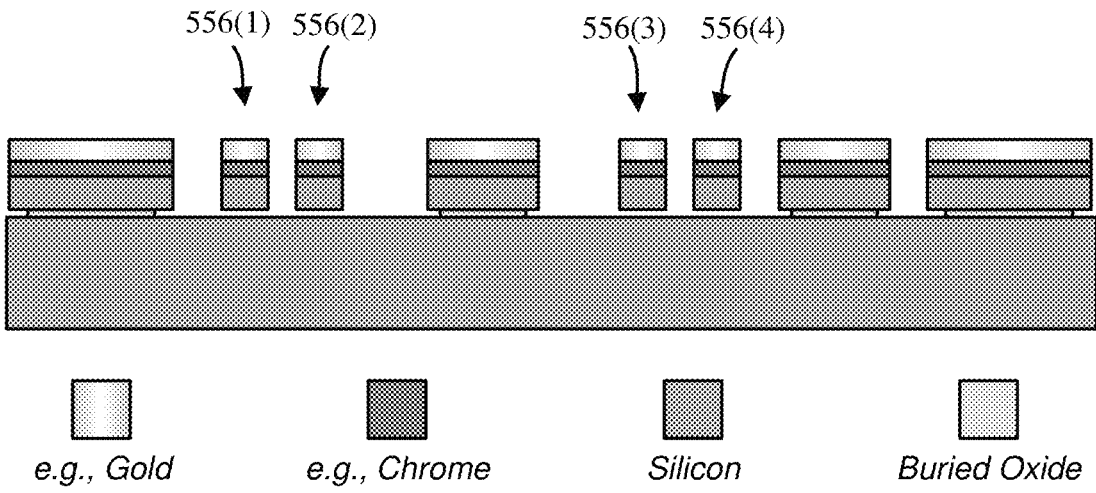
FIG. 5B is a side view of example fabricated structures showing the free-standing structures achieved after selective removal of some of the buried oxide underneath the upper silicon layer, and after addition of metal(s) to the top of the upper silicon layer, in accordance with various example embodiments and implementations of the subject disclosure.

The reconfigurable intelligent surfaces ring and laterally moveable beam patterns, along with the MEMS actuators, can be designed using a metallic layer (aluminum, silver, gold/chrome, or copper) and then carved on the top silicon layer 552 using Deep Reactive Ion Etching (DRIE). Selective removal of the sacrificial silicon dioxide layer in full allows the realization of movable structures 556(1)-556(4), as shown in FIG. 5B, in which gold and chrome are used. The structures 556(1)-556(4) with narrow widths are now freestanding (other than supported by moveable rollers/dimples as described herein), while the other structures (not separately labeled) are attached to the substrate with the help of wider buried oxide anchors.

Alternatively, the structures can be constructed using PolySilicon, complemented by a metal coating on the upper side, such as gold (Au) or aluminum (Al). In that scenario, fabrication can utilize surface micromachining techniques, such as Polysilicon Multi-User MEMS Processes (Poly-MUMPS).

Electrothermal actuators offer significant displacement and large forces, making them appealing for space and RF systems, particularly in tunable capacitor-type systems. One such electrothermal actuator, namely a two-hot-arm electrothermal MEMS actuator, is a "pseudo" bimorph structure that acts as and resembles a bimorph structure, but utilizes a single structural material with uniform thermal expansion coefficient (unlike actual bimorph actuators that work by heating materials with different expansion coefficients and creating a bending moment for out-of-plane deflection; another method involves laying the bimorph materials side-by-side to achieve in-plane displacement, but this complicates fabrication without significant displacement).

Figure 6:
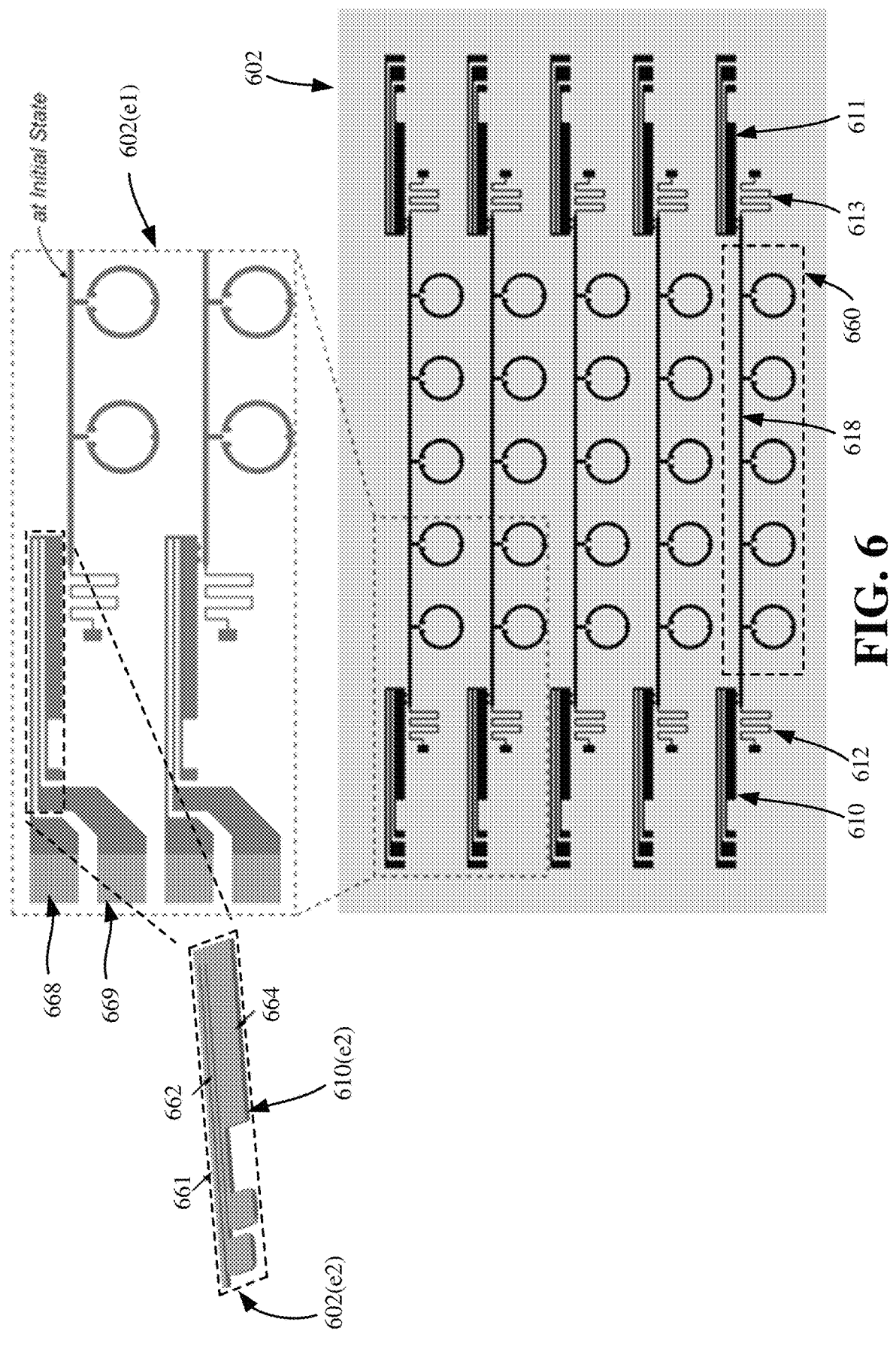
FIG. 6 is a top view representation of an example reconfigurable intelligent surface panel, along with an enlarged view of a portion thereof, with two-hot-arm MEMS actuators controlling the movement of the laterally movable beam (including one enlarged 3D view of a two-hot-arm MEMS actuator), in accordance with various example embodiments and implementations of the subject disclosure.
Figure 7:
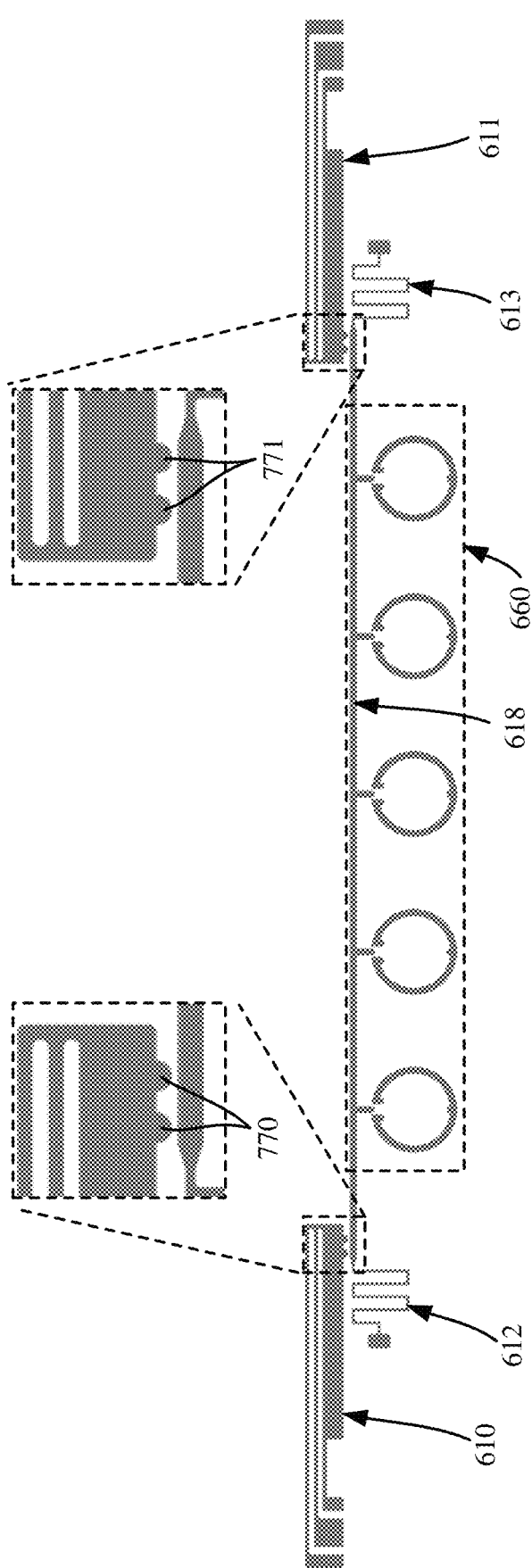
FIG. 7 is a top view representation of an example group of unit cells that share a laterally movable beam and a pair of two-hot-arm MEMS actuators, in accordance with various example embodiments and implementations of the subject disclosure.

FIG. 6 shows the concept of a two-hot-arm electrothermal MEMS actuator that can be used in a reconfigurable intelligent surface 602 (with an example 5×5 array of unit cells). In the example implementation of FIG. 6, the metallic inserts of an entire row 660 of unit cells (enlarged in FIG. 7) are affixed to a shared movable beam 618, rendered mobile by employing two MEMS actuators 610 and 611 positioned at the ends of the row 660. The movable beam 618 is anchored at the ends with flexure structures 612 and 613 to provide the lateral flexibility. FIG. 7 also shows the contact points 770 and 771 that physically, but not structurally, couple the free ends of the actuators 610 and 611, respectively, to the moveable beam 618. The same configuration can be repeated for the other rows, as represented in FIG. 6.

As shown in the enlarged portions 602(e1) and 602(e2), a two-hot-arm electrothermal MEMS actuator 610(e2) is characterized by two thin arms (in terms of width) 661 and 662, and one thick arm 664 anchored at one end (contacts 668 and

669) with free movement at the other end, arranged geometrically in the shape of a 'U'. When a voltage difference is applied at the anchors contacts 668 and 669, an electrical current is passed through this actuator resulting in joule heating. The joule heating increases the temperature of the two thin arms of the actuator, causing in-plane (XY-plane) deformation of the cold (thick) arm 664 of the actuator, owing to the expansion difference between hot arms 661 and 662 and cold arm 664. Two of these actuators (e.g., 610 and 611) are placed at a small gap at the ends of the common beam (e.g., 618) connecting the row of RIS unit cells, pushing it in y-direction when actuated.

It should be noted that a row (subgroup) of unit cells can have the same phase adjustment by selectively applying voltage that results in the same amount of displacement at both ends of the moveable beam. However, the moveable the beam can be independently moved more at one end than the other end, providing additional phase profiles. Further, the size of the subgroup can be different than depicted, up to a practical limit, and there can be differently-sized subgroups of unit cells on the same reconfigurable intelligent surface. Still further, a single actuator can be used, e.g., to push the center of the moveable beam (such as for a small subgroup) rather than two actuators at each end of the beam.

Figure 8:
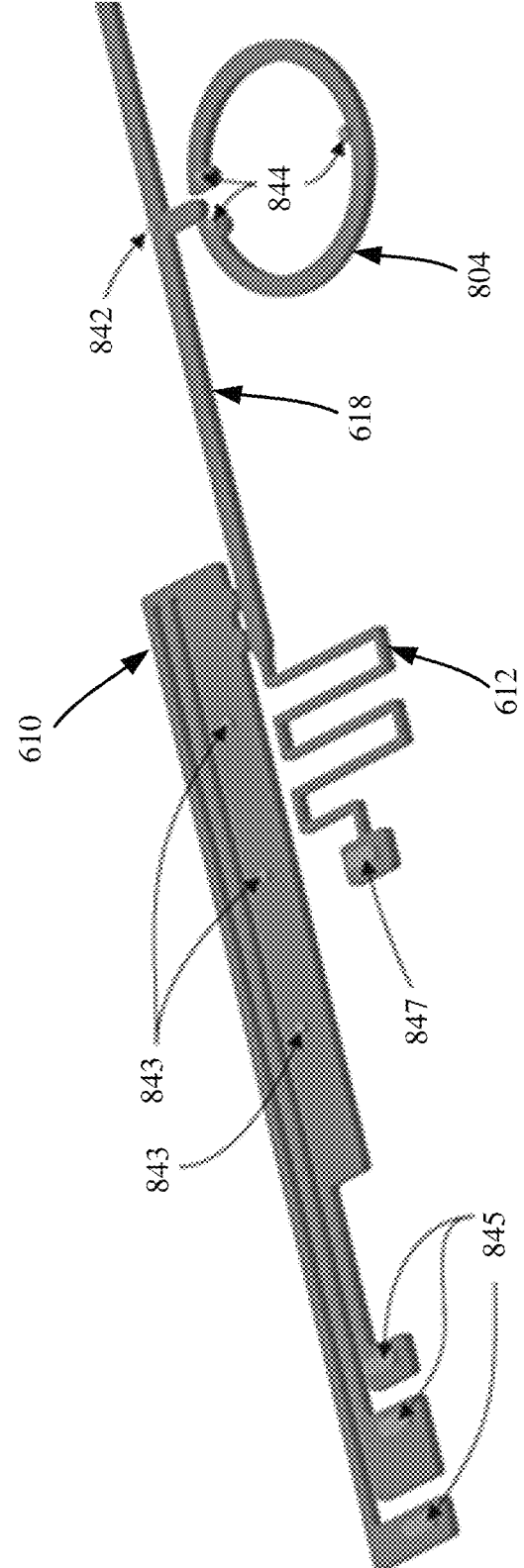
FIG. 8 is a bottom three-dimensional view showing rollers/dimples facilitating lateral movement of the MEMS actuator and moveable beam in the XY-plane (and not vertical movement in Z-direction) of the example moveable beam, in accordance with various example embodiments and implementations of the subject disclosure.

FIG. 8 shows a bottom view of the actuator 610 and unit cell (split ring 804 and corresponding portion of the moveable beam 618). As can be seen, rollers 842 and 843 support the moveable elements 618 and 610, respectively, allowing lateral movement in the XY plane and not in the Z direction. In other words, the dimples can move freely in the plane of the substrate (in the XY plane) but do not move in the direction perpendicular to the substrate (in the Z direction). Also shown in FIG. 8 are the fixed portions, that is, the split ring 804 is anchored by anchors 844, the outer end of the actuator 610 is anchored by anchors 845, and the outer end of the flexor is anchored by anchor 847. Note that in this example, the moveable portion of the actuator 610 is physically coupled to the moveable beam just inside the flexor 612.

Figure 9:
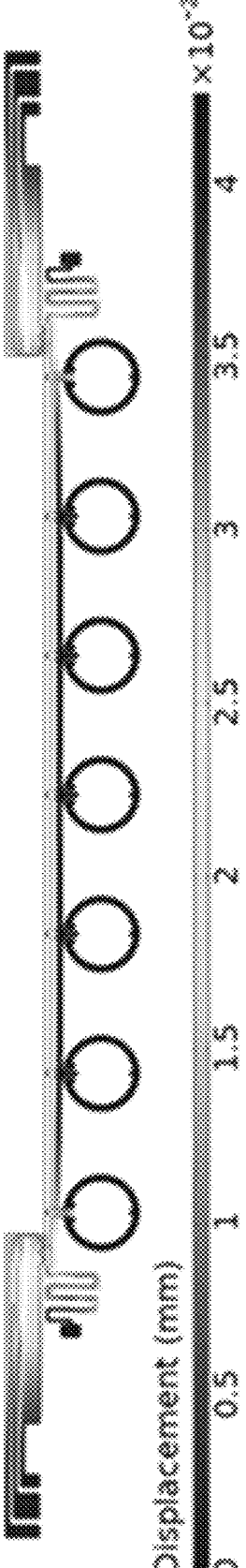
FIG. 9 is a top view representation of the simulated structural displacement in the example laterally movable beam, in accordance with various example embodiments and implementations of the subject disclosure.
Figure 10:
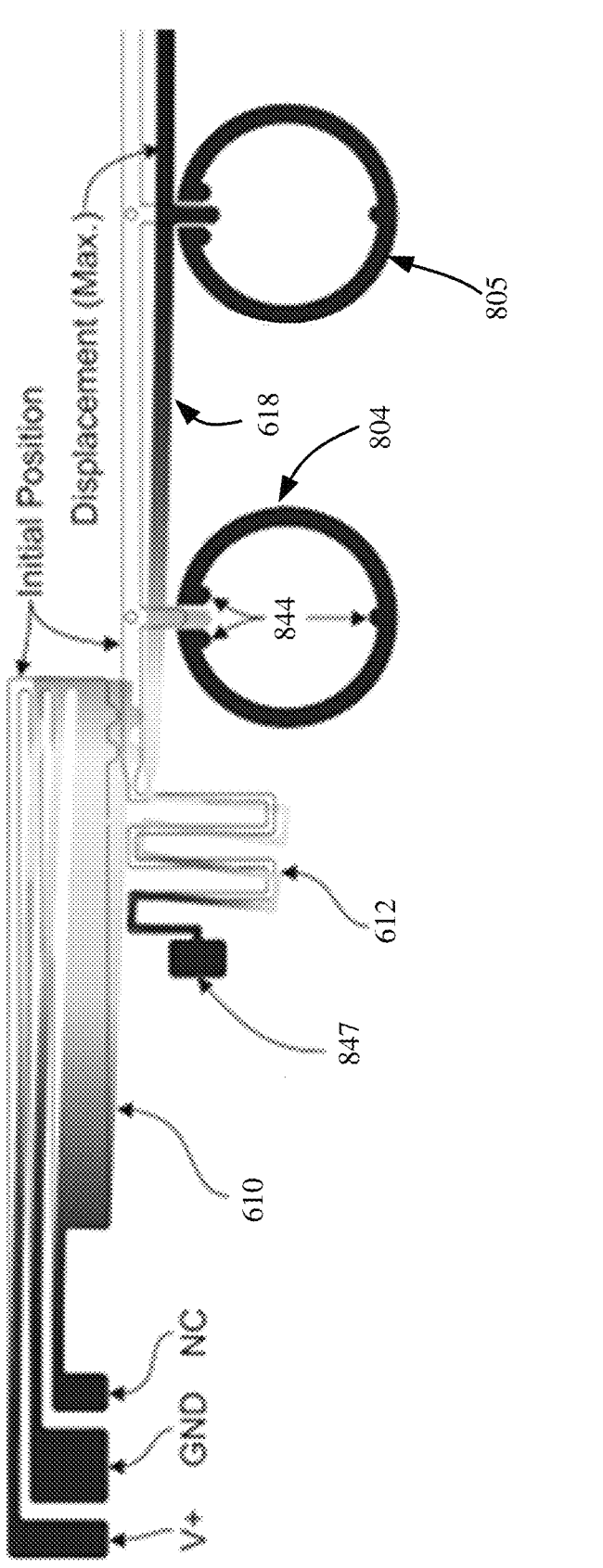
FIG. 10 is a top view representation showing the displacement of the example moveable beam, including when the arm of the two-hot arm actuator pushes the movable beam in an actuated state, in accordance with various example embodiments and implementations of the subject disclosure.

An analysis (e.g., via COMSOL Multiphysics software), including electric, thermal, and structural aspects, along with a parametric study for the applied voltage to the actuators can be conducted to further describe the actuator's functionality when integrated with the reconfigurable intelligent surface as shown in FIGS. 9 and 10. FIG. 9 shows the simulated structural displacement in the movable beam. Note that the inserts at the ends of the moveable beam are not displaced as much as the inserts towards the center, however this still facilitates controllable overall phase shift of the row when considered as a whole. Further, the outermost rings can be eliminated during the design of a reconfigurable intelligent surface to reduce any effect of such displacement differences, resulting in less unit cells per row.

FIG. 10 shows the displacement in the arm of the two-hot arm actuator 610, which pushes the movable beam between its initial (zero voltage/non-actuated) portion and the maximum displacement position, based on the applied voltage. Note that the flexor 612 helps restore the moveable beam back towards the initial position as the actuator 610 cools.

Figure 11:
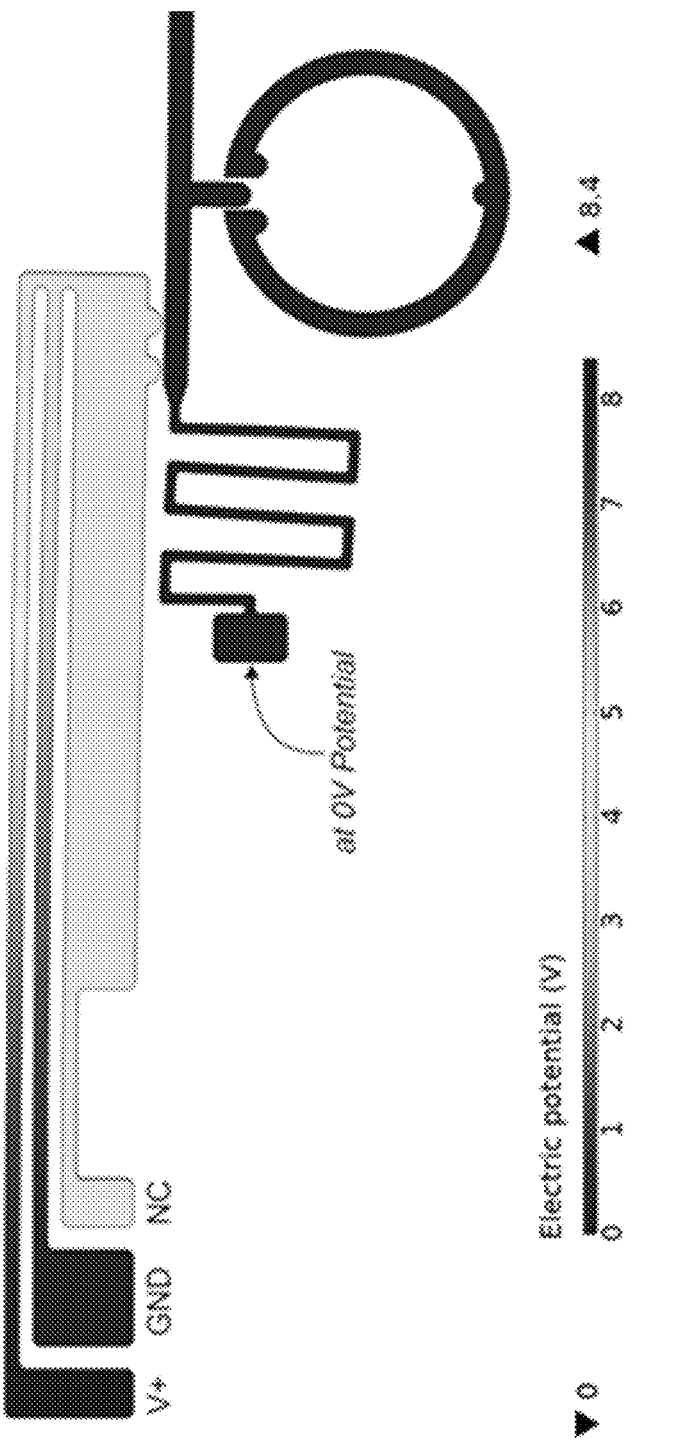
FIG. 11 is a top view representation showing a simulated example of electric potential distribution with applied voltage to the actuator, in accordance with various example embodiments and implementations of the subject disclosure.
Figure 12:
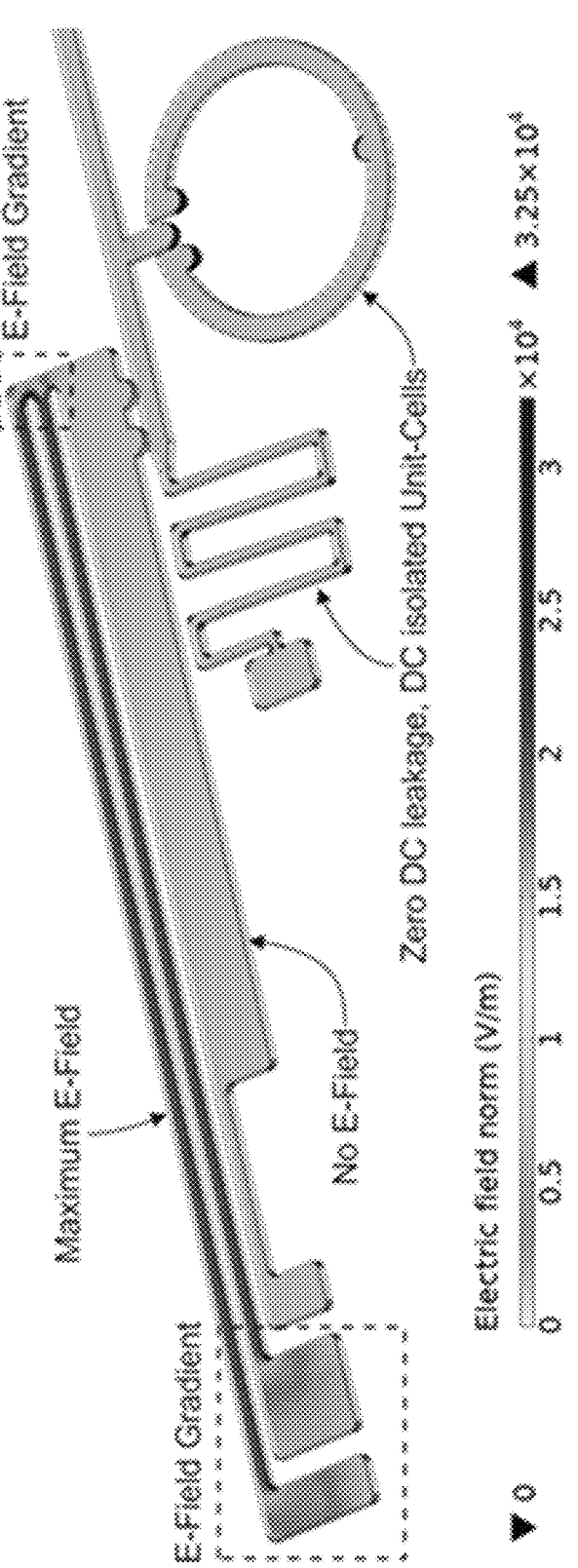
FIG. 12 is a three-dimensional representation showing a simulated example of the normalized electric field over the actuator with a maximum electric field in the two-thin arms of the actuator, in accordance with various example embodiments and implementations of the subject disclosure.

FIG. 11 shows the deformed geometry of the actuator when an electric potential is applied to the two thin arms of the actuator. In this example, a maximum voltage of 8.5 V is applied to achieve the maximum deformation. The corresponding normalized electric field (E-field) distribution is shown in FIG. 12. Because the entire current passes through the two thin arms, the maximum electric field is seen in these two arms.

Figure 13:
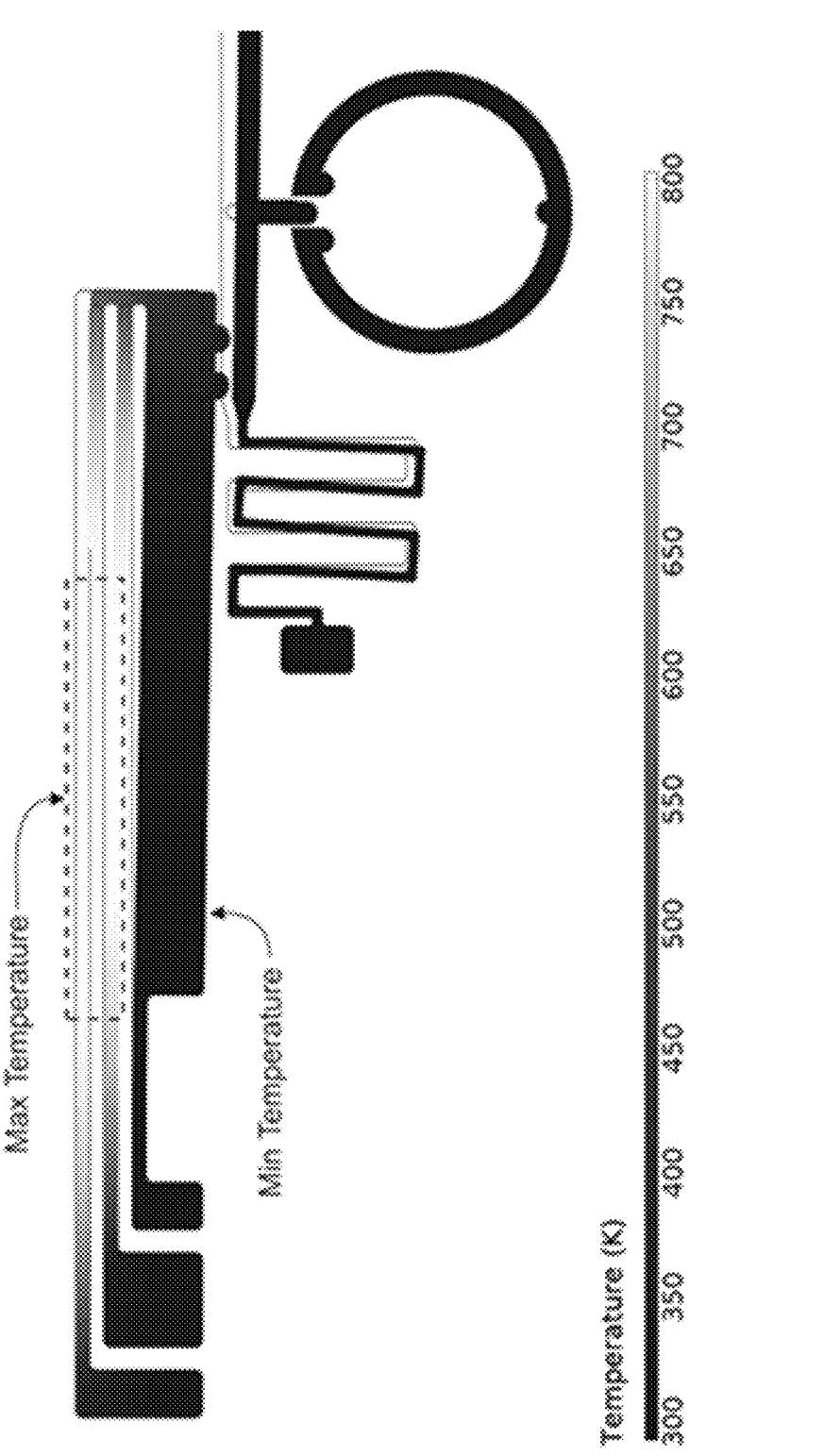
FIG. 13 is a top view representation showing the simulated temperature distribution in the two-thin arms of the actuator due to the Joule heating effect, in accordance with various example embodiments and implementations of the subject disclosure.
Figure 14:
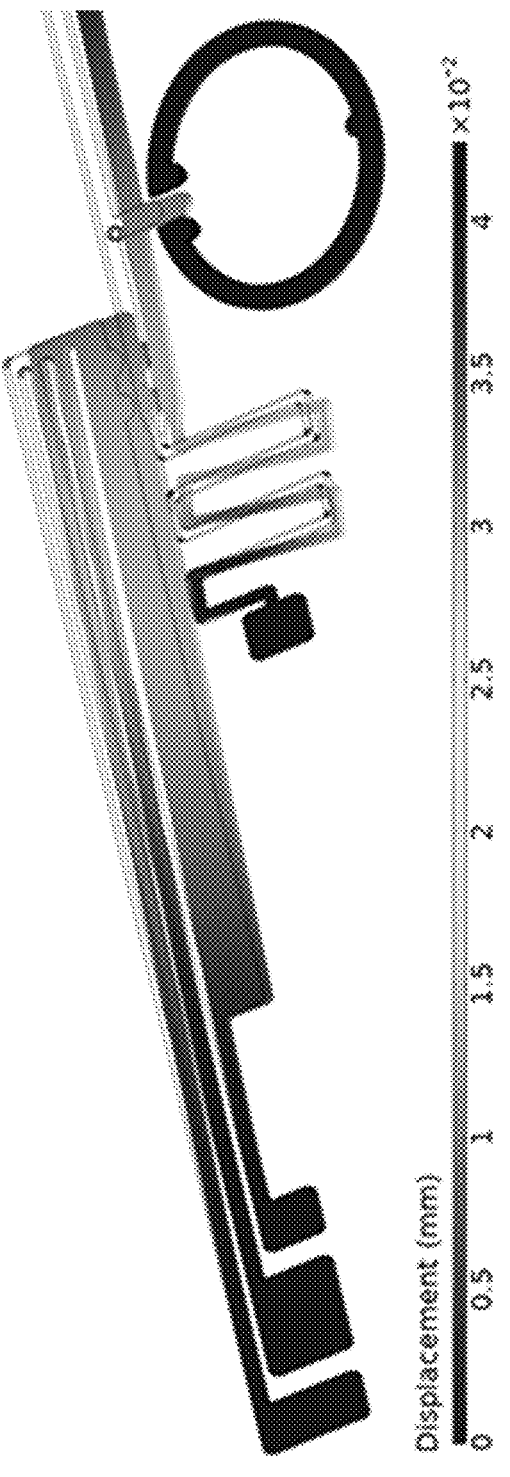
FIG. 14 is a three-dimensional representation showing simulated displacement of the tip of the actuator with the applied voltage, in accordance with various example embodiments and implementations of the subject disclosure.
Figure 15:
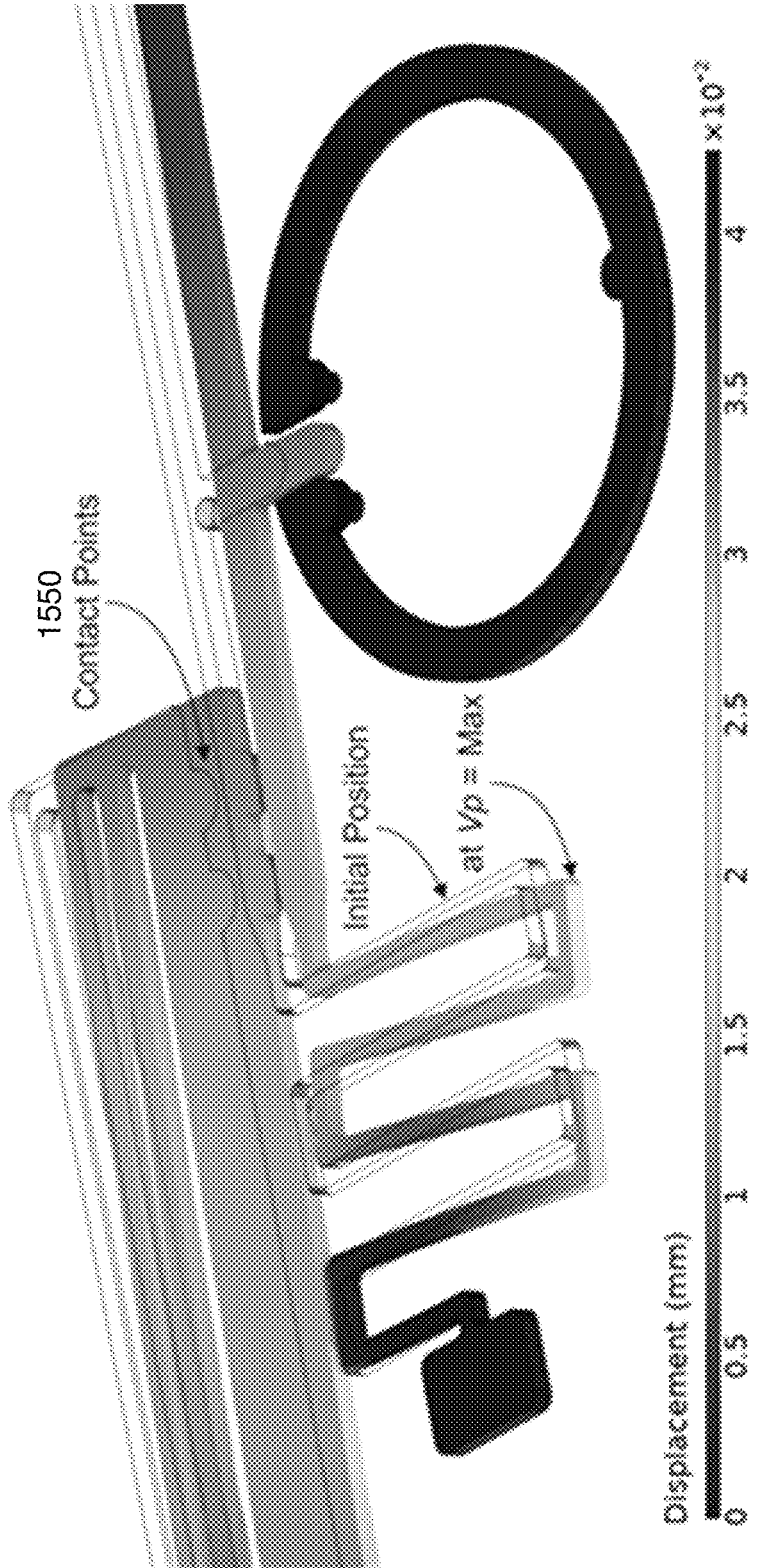
FIG. 15 is a three-dimensional representation of an enlarged portion of FIG. 14 showing how the displaced actuator causes displacement in the movable beam with the protruding metallic insert, in accordance with various example embodiments and implementations of the subject disclosure.

The Joule heating in the actuator arms is shown in FIG. 13. The maximum temperature is observed in the thin arms, justifying the name "two-hot-arm actuator". FIGS. 14 and 15 highlight the corresponding total displacement distribution in the actuator and the movable arm.

It can be seen how the flexures at the ends of the movable arms help with the flexible displacement. As the voltage is decreased (the device starts to cool down), the movable beam starts returning to its original position, highlighting the repeatability of the operation. Further, because as described herein the movable beam 618 with the metallic inserts is not structurally attached to the actuator, but instead is only physically coupled to the actuator at the contact points (e.g., 770, FIG. 7), no DC current leaks into the unit cell structure (the DC and RF are decoupled).

To summarize, by manipulating the metallic inclusion using the two-hot arm actuators, the effective capacitance of the split ring gap is altered, thereby leading to tuning of the reconfigurable intelligent surface unit cell resonance frequency. Precise control of electrical voltage applied to individual actuators enables continuous tuning of the resonance frequency of unit cells.

Figures 16A, 16B:
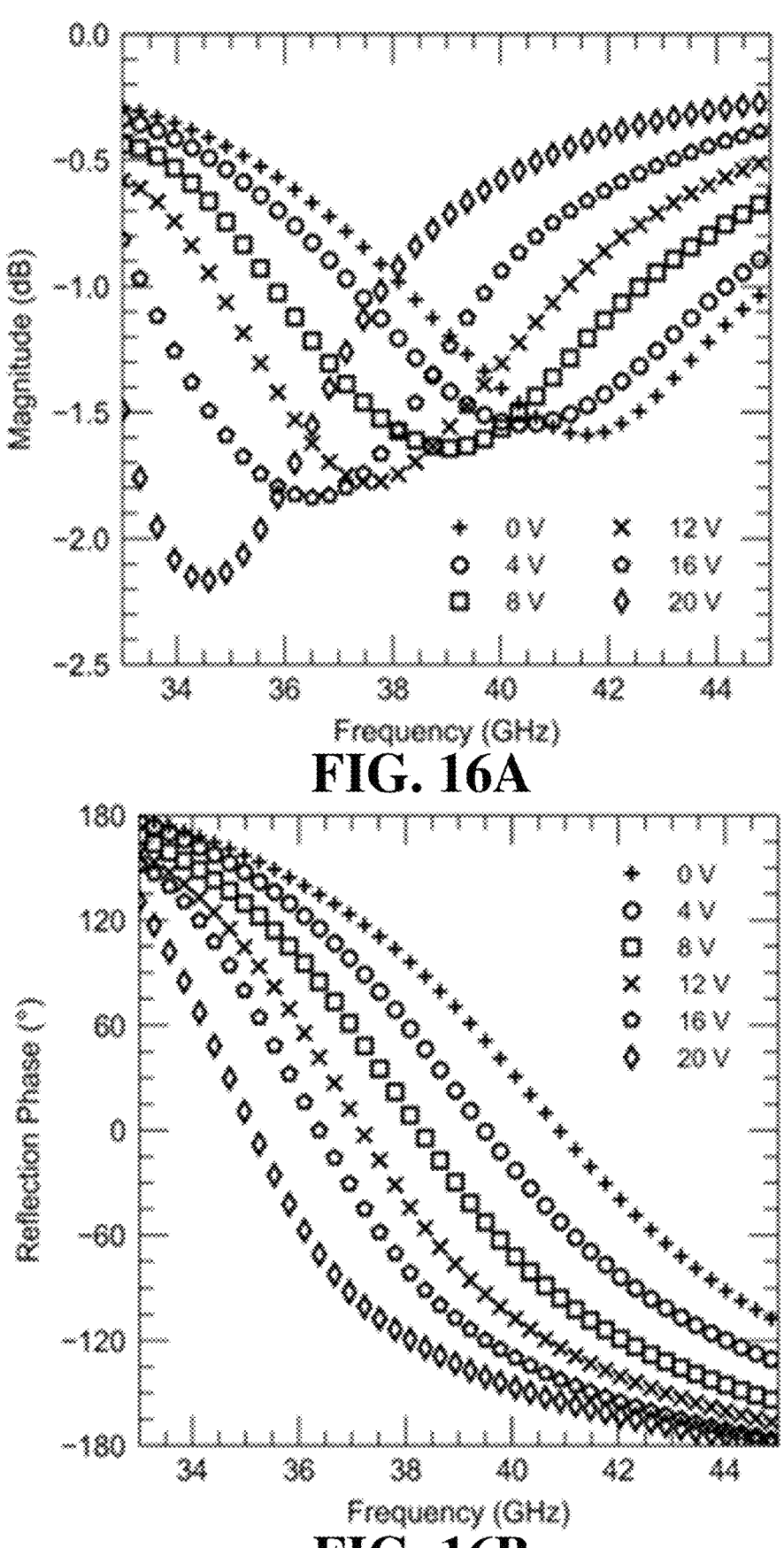
FIG. 16A is an example graphical representation of magnitude of a unit cell at 40 GHz for varying voltages from 0 to 20 V with 4 V step size, in accordance with various example embodiments and implementations of the subject disclosure.
FIG. 16B is an example graphical representation of reflection phase of a unit cell at 40 GHz for varying voltage from 0 V to 20 V at the anchors with 4 V step size, in accordance with various example embodiments and implementations of the subject disclosure.
Figure 17A:
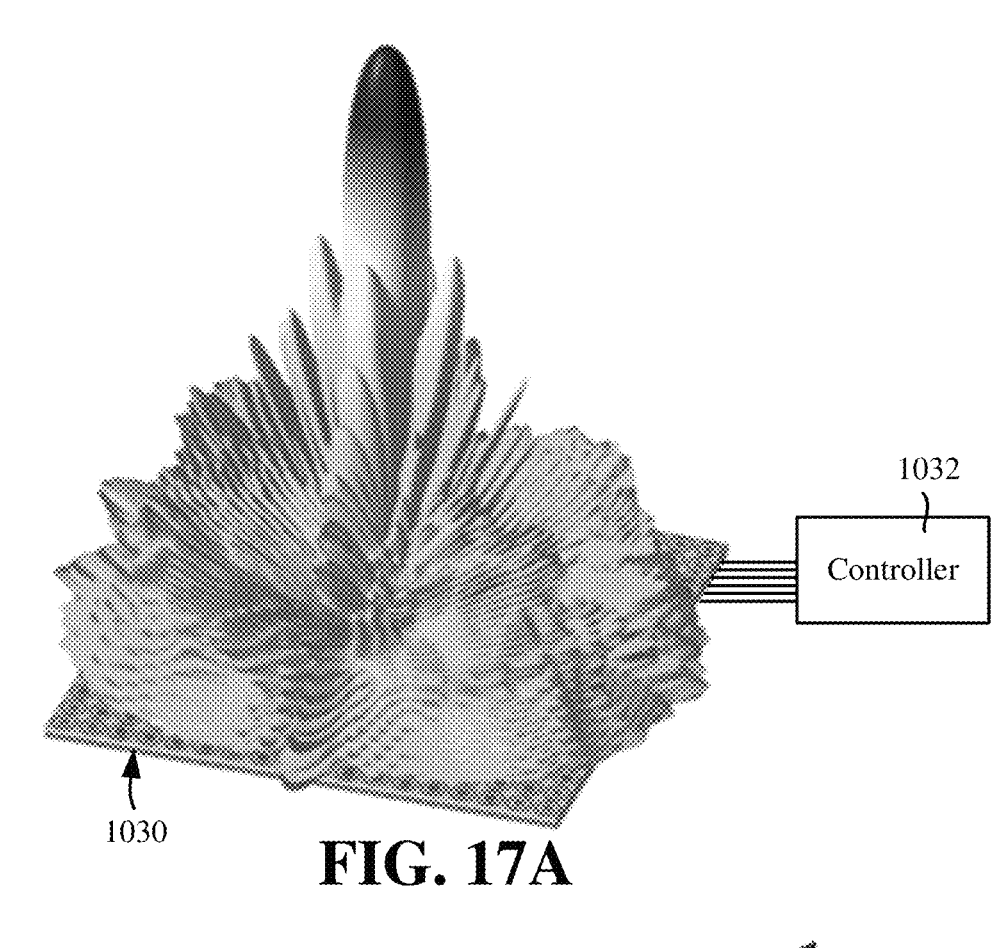
FIGS. 17A and 17B are example representations of beam steering of a reflected incoming electromagnetic wave in which reflected beam can be steered in desired target directions based on the voltages applied to the cantilevers/middle rings of the unit cells.
Figure 17B:
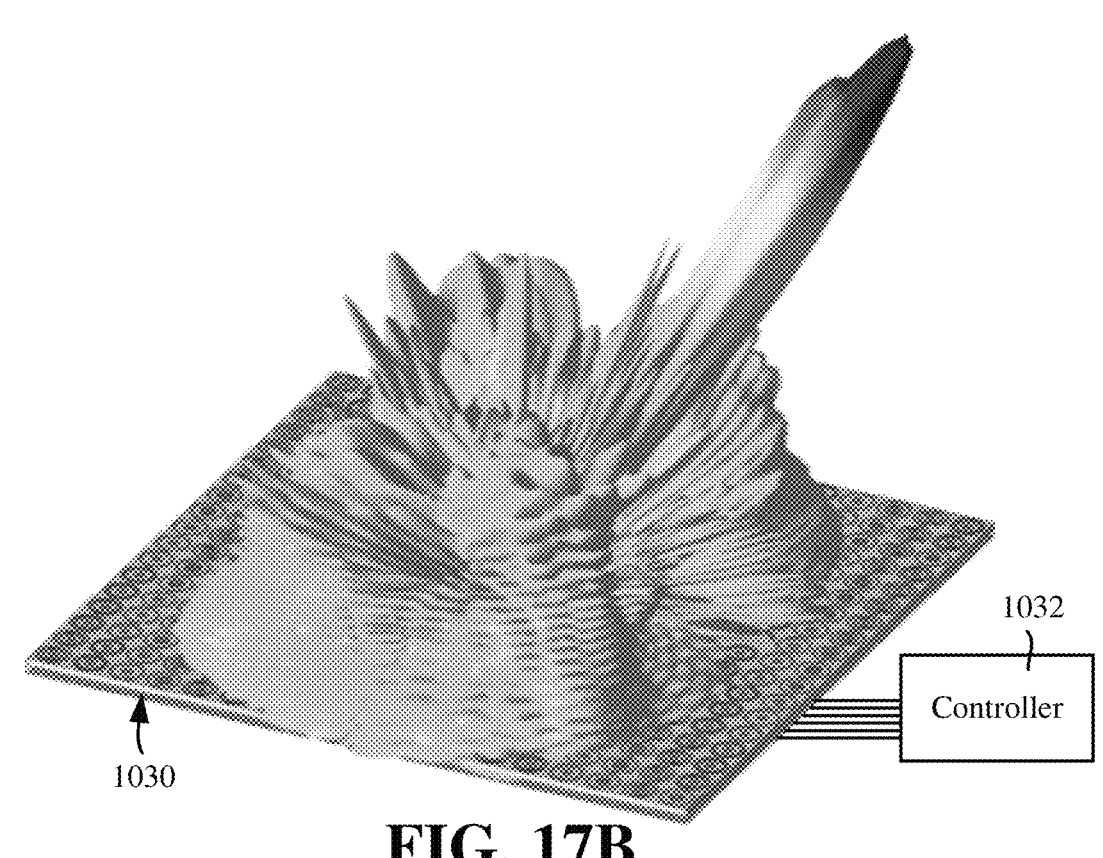

Full wave analysis can be done in three-dimensional (3D) electromagnetic simulation software (e.g., Ansys HFSS) to extract the reflection characteristics of the unit cell for the tuning range. Periodic boundary conditions can be used during simulation of the cell, which assume an infinite structure. Parametric simulations can be done for different displacement levels of the ring cantilever by adjusting the applied voltage. Initially, with 0 V applied to the actuators, the resonance frequency is at 42 GHz, indicating the default state. Continuous tuning of the resonant frequency is observed with increasing input voltage. When the voltage is 20V, the resonant frequency is at 34.5 GHz as shown in FIGS. 16A and 16B, which show the full field 3D EM simulated magnitude (FIG. 16A) and reflection phase (FIG. 16B) of a unit cell for varying voltages from 0 to 20 V at the anchors with 4 V step size.

The reason for this phenomenon is that the resonant frequency of the reconfigurable intelligent surface structure can be given as:

$$\omega = \sqrt{\frac{1}{LC}},$$

where L and C refer to the effective inductance and capacitance in the reconfigurable intelligent surface structure that enables coupling of the incident electromagnetic wave. It can be quantitatively seen that as the metallic insert is pushed towards the split ring, the resulting capacitance increases and hence the resonance frequency decreases. Compared to an electrostatic actuation mechanism, a larger range of motion can be achieved by using electrothermal actuation, which causes a larger shift in the resonance frequency and the corresponding output phase.

This change in phase from individual unit cell leads to constructive/destructive interference in the desired direction when combined into an array to form a reconfigurable intelligent surface panel. Such beam steering is shown in FIGS. 10A and 10B in which the reflected beam can be steered in a desired direction based on the voltages applied to the actuators of the unit cells/unit cell subgroups. More particularly, for redirecting impinging signals, the reconfigurable intelligent surface 1040 is coupled to or otherwise incorporates the controller 1042 that controls the phase shifts of the unit cells designed for signal redirection by applying appropriate voltages (e.g., from zero volts to the maximum voltage) to the unit cells to move the lateral beams to change the unit cells' respective phases, facilitating constructive (or destructive interference) for beamforming. Beamforming allows the incoming electromagnetic wave/ signal to be redirected (reflected or refracted) as a beam that can be shaped and steered in a desired direction, as shown in FIG. 10A (one set of respective voltages for the respective unit cell subgroups), and 10B (another set of respective voltages for the respective unit cell subgroups).

To summarize, the MEMS-based actuator for a reconfigurable unit cell offers a higher tuning range, larger stroke, and enhanced repeatability compared to other unit cell technologies, achieving a maximum tuning range on the order of approximately 8 GHz using up to a 20 V input voltage. This electrothermal approach is particularly effective for applications needing substantial displacements and force outputs at the millimeter/microscale device level.

One or more example embodiments can be embodied in a device, such as described and represented herein. The device can include a subgroup of unit cells, comprising respective fixed split ring resonators having respective gaps, and a laterally moveable beam comprising respective inserts aligned with the respective gaps of the respective split rings, wherein respective opposite ends of the laterally moveable beam are coupled to respective flexures, the respective flexures having respective anchored portions physically coupled to a substrate and respective non-anchored portions physically coupled to the respective opposite ends of the laterally moveable beam, to facilitate lateral displacement of the laterally moveable beam and the respective inserts. The device can include a microelectromechanical systems (MEMS)-based electrothermal actuator system comprising an actuator having a free end physically coupled to the laterally moveable beam, and a fixed end physically and electrically coupled to electrical contact pads anchored to the substrate. Energy applied via the electrical contact pads actuates the MEMS-based electrothermal actuator system from a non-actuated state corresponding to a first lateral position to an actuated state corresponding to a second lateral position, to move the laterally moveable beam to change first respective lateral displacement distances of the respective inserts relative to the respective gaps of the respective split rings, to second respective lateral displacement distances of the respective inserts relative to the respective gaps of the respective split rings; the respective second lateral displacement distances are based on an amount of the energy applied. In response to an impinging electromagnetic wave on the subgroup of unit cells, the respective fixed split ring resonators resonate to redirect an instance of the electromagnetic based on respective phase shifts determined by the first respective lateral displacement distances of the respective inserts in response to MEMS-based electrothermal actuator system being in the non-actuated state, and the second respective lateral displacement distances of the respective inserts in response to the MEMS-based electrothermal actuator system being in the actuated state.

The MEMS-based electrothermal actuator system can include a two-hot-arm electrothermal MEMS actuator.

The laterally moveable beam can be supported on the substrate by one or more roller protrusions.

The MEMS-based electrothermal actuator system can include respective electrothermal MEMS actuators having respective free ends coupled to respective ends of the laterally moveable beam.

The respective moveable free ends of the electrothermal MEMS actuators can be supported on the substrate by respective one or more roller protrusions.

The MEMS-based electrothermal actuator system can include respective electrothermal MEMS actuators that can include respective first parts anchored to the substrate and respective moveable second parts that are physically coupled to respective opposite ends of the laterally moveable beam proximate to the respective non-anchored ends of the respective flexures.

In the non-actuated state, the respective flexors can restore the second respective lateral displacement distances of the respective inserts to the first respective lateral displacement distances of the respective inserts.

The energy applied via the electrical contact pads can include a bias voltage applied across the electrical contact pads, and the amount of the energy applied can be based on a bias voltage level.

The bias voltage can include a first bias voltage, the phase shift can be a first phase shift based on the first bias voltage, and a second voltage applied across the electrical contact pads can determine a second phase shift that is different from the first phase shift.

The redirected instance can be a first redirected instance, the subgroup of unit cells can be part of a reconfigurable intelligent surface that can include the subgroup of unit cells and other subgroups of unit cells, and the phase shift of the subgroup of unit cells can redirect the first redirected instance of the electromagnetic wave in a direction that creates constructive interference with a second redirected instance of the electromagnetic wave as redirected from at least one other of the other subgroups of unit cells.

Figure 18:
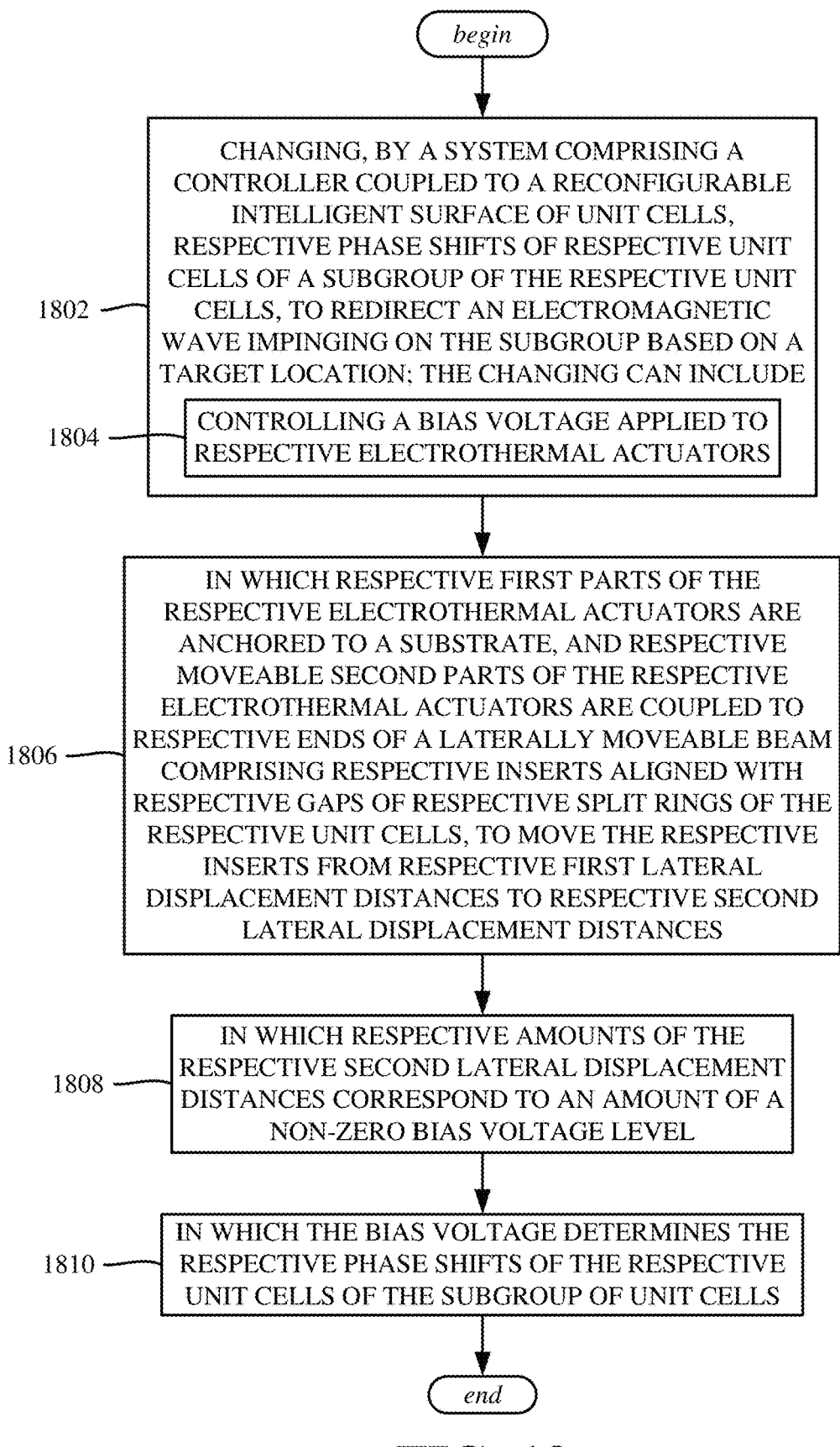
FIG. 18 is a flow diagram showing example operations related to controlling a bias voltage applied to laterally moveable beam of a microelectromechanical systems-based resonating pattern to change phase shifts of a subgroup of unit cells of a reconfigurable intelligent surface, in accordance with various example embodiments and implementations of the subject disclosure.

One or more example aspects, such as corresponding to example operations of a method, or a system/a machine-readable medium having executable instructions that, when executed by a controller, facilitate performance of the operations, are represented in FIG. 18. Example operation 1802 represents changing, by a system comprising a controller coupled to a reconfigurable intelligent surface of unit cells, respective phase shifts of respective unit cells of a subgroup of the respective unit cells, to redirect an electromagnetic wave impinging on the subgroup based on a target location. The changing can include example operation 1804, which represents controlling a bias voltage applied to respective electrothermal actuators. Example block 1806 represents that respective first parts of the respective electrothermal actuators are anchored to a substrate, and respective moveable second parts of the respective electrothermal actuators are coupled to respective ends of a laterally moveable beam comprising respective inserts aligned with respective gaps of respective split rings of the respective unit cells, to move the respective inserts from respective first lateral displacement distances to respective second lateral displacement distances. Example block 1808 represents that in which respective amounts of the respective second lateral displacement distances correspond to an amount of a non-zero bias voltage level. Example block 1810 represents that the bias voltage determines the respective phase shifts of the respective unit cells of the subgroup of unit cells.

The respective phase shifts can be first respective phase shifts, wherein the target location can be a first target location, and further operations can include obtaining, by the system, information representative of a second target location, and in response to the obtaining of the information, redirecting, by the system, the electromagnetic wave based on the second location, comprising changing the bias voltage from a first bias voltage to a second bias voltage to change the first respective phase shifts to second respective phase shifts that are different from the first respective phase shifts.

Changing the respective phase shifts based on the target location can redirect the electromagnetic wave to create constructive interference with the electromagnetic wave as redirected from at least one other subgroup of other unit cells of the reconfigurable intelligent surface, with respect to beamforming the electromagnetic wave as redirected towards the target location.

Changing the respective phase shifts based on the target location can redirect the electromagnetic wave to create destructive interference with the electromagnetic wave as redirected from at least one other subgroup of other unit cells of the reconfigurable intelligent surface.

One or more example embodiments can be embodied in a system, such as described and represented herein. The system can include a substrate, and a unit cell above the substrate, the unit cell configured to redirect an incoming electromagnetic wave as a redirected electromagnetic wave, the unit cell comprising a split ring resonator with a gap. The system further can include a capacitive tuning device, which can include a flexor comprising a first end anchored to the substrate, and a second non-anchored end, a laterally moveable beam coupled to the second non-anchored end of the flexor, the laterally moveable beam comprising a protruding insert aligned with the gap of the split ring resonator, electrical contacts anchored to the substrate, and an electrothermal actuator device. The electrothermal actuator device can include a two-hot-arm microelectromechanical systems (MEMS) actuator that can include a first part electrically and physically coupled to the electrical contacts at one end of the two-hot-arm MEMS actuator, and a moveable second part physically coupled to the laterally moveable beam. The two-hot-arm MEMS actuator and the laterally moveable beam can be in a first position corresponding to a first lateral displacement distance of the protruding insert relative to the gap of the split ring resonator when not heated by joule heating, relative to a second position corresponding to a second lateral displacement distance, greater that the first lateral displacement distance, when heated by a non-zero amount of joule heating; a resultant amount of lateral displacement corresponds to the amount of joule heating. The system further can include a controller configured to selectively apply energy to the electrical contacts to selectively heat the two-hot-arm MEMS actuator with a selected amount of joule heating, corresponding to a selected resultant amount of lateral displacement of the insert; the resultant amount of lateral displacement can determine a direction of the redirected electromagnetic wave.

The two-hot-arm MEMS actuator can be a first two-hot-arm MEMS actuator coupled to a first part of the laterally moveable beam, and the tuning device further can include a second two-hot-arm MEMS actuator coupled to a second part of the laterally moveable beam.

The unit cell can be a first unit cell of a reconfigurable intelligent surface that can include the first unit cell and a second unit cell, the selected amount of joule heating can be a first selected amount, the redirected electromagnetic wave can be a first redirected electromagnetic wave, the direction of the first redirected electromagnetic wave can be a first direction, and the controller can select the first selected amount of joule heating for the first unit cell, and select a second selected amount of joule heating for the second unit cell, to create constructive interference of the first redirected electromagnetic wave with a second redirected electromagnetic wave as redirected from the second unit cell in a second direction.

The unit cell can be one unit cell of a group of respective unit cells that share the laterally moveable beam, the split ring resonator with the gap can be one split ring resonator with one gap of respective split ring resonators with respective gaps of the respective unit cells, the protruding insert can be one protruding insert of respective protruding inserts of the laterally moveable beam aligned with the respective gaps, and the resultant amount of lateral displacement distance can be one resultant amount of respective resultant amounts of lateral displacement distances.

The group of respective unit cells can be a first group of respective unit cells of a reconfigurable intelligent surface that can include the first group of respective unit cells and a second group of respective unit cells, the selected amount of joule heating can be a first selected amount applied to the first group, the redirected electromagnetic wave can be a first redirected electromagnetic wave, the direction of the first redirected electromagnetic wave can be a first direction, and the controller can select the first selected amount of joule heating for the first group, and select a second selected amount of joule heating for the second group, to create constructive interference of the first redirected electromagnetic wave with a second redirected electromagnetic wave as redirected from the second unit cell in a second direction.

The unit cell can include at least one of: gold, chrome, aluminum, silver, or copper.

As can be seen, the technology described herein is directed to a reconfigurable intelligent surface that integrates MEMS micro-actuators for subgroups of unit cells of a reconfigurable intelligent surface, facilitating dynamic reshaping of unit cell geometries without the need for PIN diodes/varactors. By combining MEMS and reconfigurable intelligent surface technologies as described herein, the example unit cells designs facilitate MEMS integration with a reconfigurable intelligent surface that overcomes many current limitations in reconfigurable intelligent surface technologies, facilitating advanced wireless communication solutions. By seamlessly integrating MEMS with reconfigurable intelligent surface designs, e.g., during the fabrication process, active tuning capabilities result from the integration of bias networks, without the need for on-chip soldering of components and hence eliminating any intricate wiring complexities.

In one implementation, each reconfigurable intelligent surface unit cell includes a split ring pattern and a portion of a laterally moveable beam including an insert aligned with the gap of the split ring. Control of the amount of lateral displacement via a continuously tunable millimeter-wave unit cell can be accomplished by applying an analog voltage to heat an actuator that pushes the laterally moveable beam and its metallic input. Consequently, an incident electromagnetic wave reflects off the two-dimensional array of such unit cells in a controlled direction based on the varying phase values determined by the structural displacement of the metallic input in each unit cell split ring.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A device, comprising:
a subgroup of unit cells, comprising respective fixed split ring resonators having respective gaps;
a laterally moveable beam comprising respective inserts aligned with the respective gaps of the respective split rings, wherein respective opposite ends of the laterally moveable beam are coupled to respective flexures, the respective flexures having respective anchored portions physically coupled to a substrate and respective non-anchored portions physically coupled to the respective opposite ends of the laterally moveable beam, to facilitate lateral displacement of the laterally moveable beam and the respective inserts;

a microelectromechanical systems (MEMS)-based electrothermal actuator system comprising an actuator having a free end physically coupled to the laterally moveable beam, and a fixed end physically and electrically coupled to electrical contact pads anchored to the substrate, wherein energy applied via the electrical contact pads actuates the MEMS-based electrothermal actuator system from a non-actuated state corresponding to a first lateral position to an actuated state corresponding to a second lateral position, to move the laterally moveable beam to change first respective lateral displacement distances of the respective inserts relative to the respective gaps of the respective split rings, to second respective lateral displacement distances of the respective inserts relative to the respective gaps of the respective split rings, wherein the respective second lateral displacement distances are based on an amount of the energy applied, wherein, in response to an impinging electromagnetic wave on the subgroup of unit cells, the respective fixed split ring resonators resonate to redirect an instance of the electromagnetic based on respective phase shifts determined by:

the first respective lateral displacement distances of the respective inserts in response to MEMS-based electrothermal actuator system being in the non-actuated state, and the second respective lateral displacement distances of the respective inserts in response to the MEMS-based electrothermal actuator system being in the actuated state.

2. The device of claim 1, wherein the MEMS-based electrothermal actuator system comprises a two-hot-arm electrothermal MEMS actuator.

3. The device of claim 1, wherein the laterally moveable beam is supported on the substrate by one or more roller protrusions.

4. The device of claim 1, wherein the MEMS-based electrothermal actuator system comprises respective electrothermal MEMS actuators having respective free ends coupled to respective ends of the laterally moveable beam.

5. The device of claim 4, wherein the respective moveable free ends of the electrothermal MEMS actuators are supported on the substrate by respective one or more roller protrusions.

6. The device of claim 1, wherein the MEMS-based electrothermal actuator system comprises respective electrothermal MEMS actuators comprising respective first parts anchored to the substrate and respective moveable second parts that are physically coupled to respective opposite ends of the laterally moveable beam proximate to the respective non-anchored ends of the respective flexures.

7. The device of claim 1, wherein, in the non-actuated state, the respective flexors restore the second respective lateral displacement distances of the respective inserts to the first respective lateral displacement distances of the respective inserts.

8. The device of claim 1, wherein the energy applied via the electrical contact pads comprises a bias voltage applied across the electrical contact pads, and wherein the amount of the energy applied is based on a bias voltage level.

9. The device of claim 8, wherein the bias voltage comprises a first bias voltage, wherein the phase shift is a first phase shift based on the first bias voltage, and wherein a second voltage applied across the electrical contact pads determines a second phase shift that is different from the first phase shift.

10. The device of claim 1, wherein the redirected instance is a first redirected instance, wherein the subgroup of unit cells is part of a reconfigurable intelligent surface comprising the subgroup of unit cells and other subgroups of unit cells, and wherein the phase shift of the subgroup of unit cells redirects the first redirected instance of the electromagnetic wave in a direction that creates constructive interference with a second redirected instance of the electromagnetic wave as redirected from at least one other of the other subgroups of unit cells.

11. A method, comprising, changing, by a system comprising a controller coupled to a reconfigurable intelligent surface of unit cells, respective phase shifts of respective unit cells of a subgroup of the respective unit cells, to redirect an electromagnetic wave impinging on the subgroup based on a target location, the changing comprising:

controlling a bias voltage applied to respective electrothermal actuators, wherein respective first parts of the respective electrothermal actuators are anchored to a substrate, and respective moveable second parts of the respective electrothermal actuators are coupled to respective ends of a laterally moveable beam comprising respective inserts aligned with respective gaps of respective split rings of the respective unit cells, to move the respective inserts from respective first lateral displacement distances to respective second lateral displacement distances, wherein respective amounts of the respective second lateral displacement distances correspond to an amount of a non-zero bias voltage level, and wherein the bias voltage determines the respective phase shifts of the respective unit cells of the subgroup of unit cells.

12. The method of claim 11, wherein the respective phase shifts are first respective phase shifts, wherein the target location is a first target location, and further comprising:

obtaining, by the system, information representative of a second target location; and in response to the obtaining of the information, redirecting, by the system, the electromagnetic wave based on the second location, comprising changing the bias voltage from a first bias voltage to a second bias voltage to change the first respective phase shifts to second respective phase shifts that are different from the first respective phase shifts.

13. The method of claim 11, wherein the changing of the respective phase shifts based on the target location redirects the electromagnetic wave to create constructive interference with the electromagnetic wave as redirected from at least one other subgroup of other unit cells of the reconfigurable intelligent surface, with respect to beamforming the electromagnetic wave as redirected towards the target location.

14. The method of claim 11, wherein the changing of the respective phase shifts based on the target location redirects the electromagnetic wave to create destructive interference with the electromagnetic wave as redirected from at least one other subgroup of other unit cells of the reconfigurable intelligent surface.

15. A system, comprising:

a substrate;

a unit cell above the substrate, the unit cell configured to redirect an incoming electromagnetic wave as a redirected electromagnetic wave, the unit cell comprising a split ring resonator with a gap;

a capacitive tuning device, comprising:

a flexor comprising a first end anchored to the substrate, and a second non-anchored end, a laterally moveable beam coupled to the second non-anchored end of the flexor, the laterally moveable beam comprising a protruding insert aligned with the gap of the split ring resonator, electrical contacts anchored to the substrate, and an electrothermal actuator device, comprising a two-hot-arm microelectromechanical systems (MEMS) actuator comprising a first part electrically and physically coupled to the electrical contacts at one end of the two-hot-arm MEMS actuator, and a moveable second part physically coupled to the laterally moveable beam, the two-hot-arm MEMS actuator and the laterally moveable beam being in a first position corresponding to a first lateral displacement distance of the protruding insert relative to the gap of the split ring resonator when not heated by joule heating, relative to in a second position corresponding to a second lateral displacement distance, greater that the first lateral displacement distance, when heated by a non-zero amount of joule heating, wherein a resultant amount of lateral displacement corresponds to the amount of joule heating; and a controller configured to selectively apply energy to the electrical contacts to selectively heat the two-hot-arm MEMS actuator with a selected amount of joule heating, corresponding to a selected resultant amount of lateral displacement of the insert, wherein the resultant amount of lateral displacement determines a direction of the redirected electromagnetic wave.

16. The system of claim 15, wherein the two-hot-arm MEMS actuator is a first two-hot-arm MEMS actuator coupled to a first part of the laterally moveable beam, and wherein the tuning device further comprises a second two-hot-arm MEMS actuator coupled to a second part of the laterally moveable beam.

17. The system of claim 15, wherein the unit cell is a first unit cell of a reconfigurable intelligent surface comprising the first unit cell and a second unit cell, wherein the selected amount of joule heating is a first selected amount, wherein the redirected electromagnetic wave is a first redirected electromagnetic wave, wherein the direction of the first redirected electromagnetic wave is a first direction, and wherein the controller selects the first selected amount of joule heating for the first unit cell, and selects a second selected amount of joule heating for the second unit cell, to create constructive interference of the first redirected electromagnetic wave with a second redirected electromagnetic wave as redirected from the second unit cell in a second direction.

18. The system of claim 15, wherein the unit cell is one unit cell of a group of respective unit cells that share the laterally moveable beam, wherein the split ring resonator with the gap is one split ring resonator with one gap of respective split ring resonators with respective gaps of the respective unit cells, wherein the protruding insert is one protruding insert of respective protruding inserts of the laterally moveable beam aligned with the respective gaps, and wherein the resultant amount of lateral displacement distance is one resultant amount of respective resultant amounts of lateral displacement distances.

19. The system of claim 18, wherein the group of respective unit cells is a first group of respective unit cells of a reconfigurable intelligent surface comprising the first group of respective unit cells and a second group of respective unit cells, wherein the selected amount of joule heating is a first selected amount applied to the first group, wherein the redirected electromagnetic wave is a first redirected electromagnetic wave, wherein the direction of the first redirected electromagnetic wave is a first direction, and wherein the controller selects the first selected amount of joule heating for the first group, and selects a second selected amount of joule heating for the second group, to create constructive interference of the first redirected electromagnetic wave with a second redirected electromagnetic wave as redirected from the second unit cell in a second direction.

20. The system of claim 15, wherein the unit cell comprises at least one of: gold, chrome, aluminum, silver, or copper.

\*   \*   \*   \*   \*